(12) United States Patent
Easwaran et al.

(10) Patent No.: US 9,027,001 B2
(45) Date of Patent: May 5, 2015

(54) SYSTEMS AND METHODS FOR VERIFYING EXPRESSION FOLDING

(75) Inventors: Arvind Easwaran, Minneapolis, MN (US); Gabor Madl, St. Louis Park, MN (US); David V. Oglesby, Brooklyn Center, MN (US); Devesh Bhatt, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 187 days.

(21) Appl. No.: 13/545,834

(22) Filed: Jul. 10, 2012

(65) Prior Publication Data

US 2014/0019943 A1    Jan. 16, 2014

(51) Int. Cl.
  *G06F 9/44*        (2006.01)
(52) U.S. Cl.
  CPC ........................................ *G06F 8/74* (2013.01)
(58) Field of Classification Search
  CPC .............................. G06F 11/3608; G06F 8/436
  USPC .......................................................... 717/126
  See application file for complete search history.

(56) References Cited

U.S. PATENT DOCUMENTS

| | | | |
|---|---|---|---|
| 5,583,988 A | 12/1996 | Crank et al. | |
| 6,016,474 A | 1/2000 | Kim et al. | |
| 6,594,783 B1 | 7/2003 | Dollin et al. | |
| 6,983,446 B2 | 1/2006 | Charisius et al. | |
| 6,993,710 B1 | 1/2006 | Coad et al. | |
| 6,993,759 B2 | 1/2006 | Aptus et al. | |
| 7,069,547 B2 | 6/2006 | Glaser | |
| 7,137,100 B2 | 11/2006 | Iborra et al. | |
| 7,500,220 B1 | 3/2009 | Feng et al. | |
| 7,502,031 B1 | 3/2009 | Pike et al. | |
| 7,503,027 B1 | 3/2009 | Zhao et al. | |
| 7,523,023 B1 | 4/2009 | Koh et al. | |
| 7,584,465 B1 | 9/2009 | Koh et al. | |
| 7,680,632 B1 | 3/2010 | Aldrich | |

(Continued)

FOREIGN PATENT DOCUMENTS

WO       WO02101544       12/2002

OTHER PUBLICATIONS

Bhatt, D. et al., "Model-Based Development and the Implications to Design Assurance and Certification", "Digital Avionics Systems Conference", Oct. 30, 2005, pp. 1-14, vol. 2, Publisher: IEEE.

(Continued)

*Primary Examiner* — Li B Zhen
*Assistant Examiner* — Lenin Paulino
(74) *Attorney, Agent, or Firm* — Fogg & Powers LLC

(57) ABSTRACT

A system for verifying that a comparison model having folded expressions matches a reference model includes at least one memory device that stores a reference model and a comparison model, wherein the comparison model was previously generated based on the reference model. The reference model adheres to a first set of syntax and semantics, wherein the reference model includes a plurality of first expressions, each of the first expressions including a first operator and a first operand. The comparison model adheres to a second set of syntax and semantics, wherein the comparison model includes a second expression, the second expression including a second operator and a second operand. The system further includes a processing unit configured to match the second expression with the plurality of first expressions.

25 Claims, 19 Drawing Sheets

(56) References Cited

U.S. PATENT DOCUMENTS

| | | | |
|---|---|---|---|
| 7,729,894 | B1 | 6/2010 | Aldrich |
| 7,734,455 | B1 | 6/2010 | Aldrich |
| 7,752,559 | B1 | 7/2010 | Szpak et al. |
| 7,840,913 | B1 | 11/2010 | Agrawal et al. |
| 7,882,462 | B2 | 2/2011 | Ogilvie et al. |
| 7,885,792 | B2 | 2/2011 | Devane |
| 7,900,188 | B2 | 3/2011 | Costa et al. |
| 7,958,454 | B2 | 6/2011 | Gaudette |
| 7,974,823 | B1 | 7/2011 | Aldrich |
| 2002/0100022 | A1 | 7/2002 | Holzmann |
| 2002/0104072 | A1 | 8/2002 | Ecker et al. |
| 2004/0111702 | A1 | 6/2004 | Chan |
| 2004/0169591 | A1 | 9/2004 | Erkkinen |
| 2004/0210873 | A1 | 10/2004 | Tudor |
| 2005/0114841 | A1 | 5/2005 | Moskowitz et al. |
| 2006/0107253 | A1* | 5/2006 | Sano et al. .......... 717/123 |
| 2009/0083699 | A1 | 3/2009 | Santhanam |
| 2009/0125878 | A1 | 5/2009 | Cullum et al. |
| 2009/0172650 | A1 | 7/2009 | Spurlin |
| 2010/0293530 | A1 | 11/2010 | Ivancic et al. |
| 2011/0088011 | A1 | 4/2011 | Ouali |
| 2012/0011487 | A1* | 1/2012 | Matsumoto .......... 717/104 |
| 2012/0254830 | A1* | 10/2012 | Conrad et al. ........ 717/106 |
| 2012/0290736 | A1* | 11/2012 | McMillen ............ 709/231 |

OTHER PUBLICATIONS

Bhatt et al., "Towards Scalable Verification of Commercial Avionics Software", "Proceedings of the AIAA Infotech@Aerospace Conference", Apr. 2010, pp. 1-8, Publisher: American Institue of Aeronautics and Astronautics, Published in: USA.

Bhatt et al., "HiLITE: An Approach and Tool for Test Generation from Model-Based Functional Requirements", "Presentation—1st International Workshop on Aerospace Software Engineering", May 22, 2007, pp. 1-32, Publisher: Honeywell International Inc.

Buth, "Automated Code Generator Verfication Based on Algebraic Laws", "ProCoS II ESPRIT Basic research 7071", Sep. 1995, pp. 1-23, Publisher: Christian-Albrechts-Universitat Kiel.

Hans Buwalda, "Action Figures", "STQE the software testing and quality engineering magazine", Mar. 2003, pp. 42-47, Publisher: Software Quality Engineering.

Jean-Louis Camus et al., "A verifiable architecture for multi-task, multi-rate synchronous", "A verifiable architecture for multi-task, multi-rate synchronous", Jan. 2008, pp. 1-9, Publisher: ESTEREL Technologies.

Conrad, "Testing-Based Translation Validation of Generated Code in the Context of IEC 61508", "Formal Methods in System Design", Nov. 27, 2009, pp. 389-401, vol. 35, No. 3, Publisher: The MathWorks Inc.

Izerrouken, "Certifying an Automated Code Generator Using Formal Tools: Preliminary Experiments in the Geneauto Project", "European Congress on Embedded Real-Time Software (ERTS)", at least as early as Jan. 2008, pp. 1-10.

Owre, "PVS: A Prototype Verification System", "11th International Conference on Automated Deduction (CADE)", Jun. 1992, pp. 1-6, vol. 607, Publisher: Springer-Verlag.

"Software Considerations in Airborne Systems and Equipment Certification", "http://www.rtca.org", Dec. 1992, pp. 1-112, Publisher: RTCA SC-167 EUROCAE WG-12 DO-178B.

Ryabtsev, "Translation Validation: From Simulink to C", at least as early as Dec. 2009, pp. 1-6.

ESTEREL Technologies, "Efficient Development of Safe Avionics Software with DO-178B Objectives Using SCADE Suite", "Methodology Handbook", Jul. 2010, pp. 1-110, Publisher: ESTEREL Technologies.

ESTEREL Technologies, "SCADE Model-Based Development Solution for Aerospace & Defense", "SCADE Model-Based Development Solution for Aerospace & Defense", Jan. 2008, pp. 1-4, Publisher: ESTEREL Technologies.

Mathworks, "Simulink Code Inspector User's Guide", "Simulink Code Inspector User's Guide", Sep. 2011, pp. 1-55, Publisher: The MathWorks Inc.

"Simulink Code Inspector", "Accessed from http://www.mathworks.com/products/datasheets/pdf/simulink-code-inspector.pdf", Sep. 1, 2011, pp. 1-4, Publisher: The Mathworks Inc.

Mathworks, "Simulink Code Inspector Strengthens MathWorks Support for DO-178 Certification", "Simulink Code Inspector Strengthens MathWorks Support for DO-178 Certification", Sep. 8, 2011, pp. 1-2, Publisher: The MathWorks Inc.

Mathworks, "Simulink Code Inspector Release Notes", "Simulink Code Inspector Release Notes", at least as early as Sep. 2011, pp. 1-9, Publisher: The MathWorks Inc.

Mathworks, "Simulink Code Inspector Reference", "Simulink Code Inspector Reference", Sep. 2011, pp. 1-175, Publisher: The MathWorks Inc.

* cited by examiner

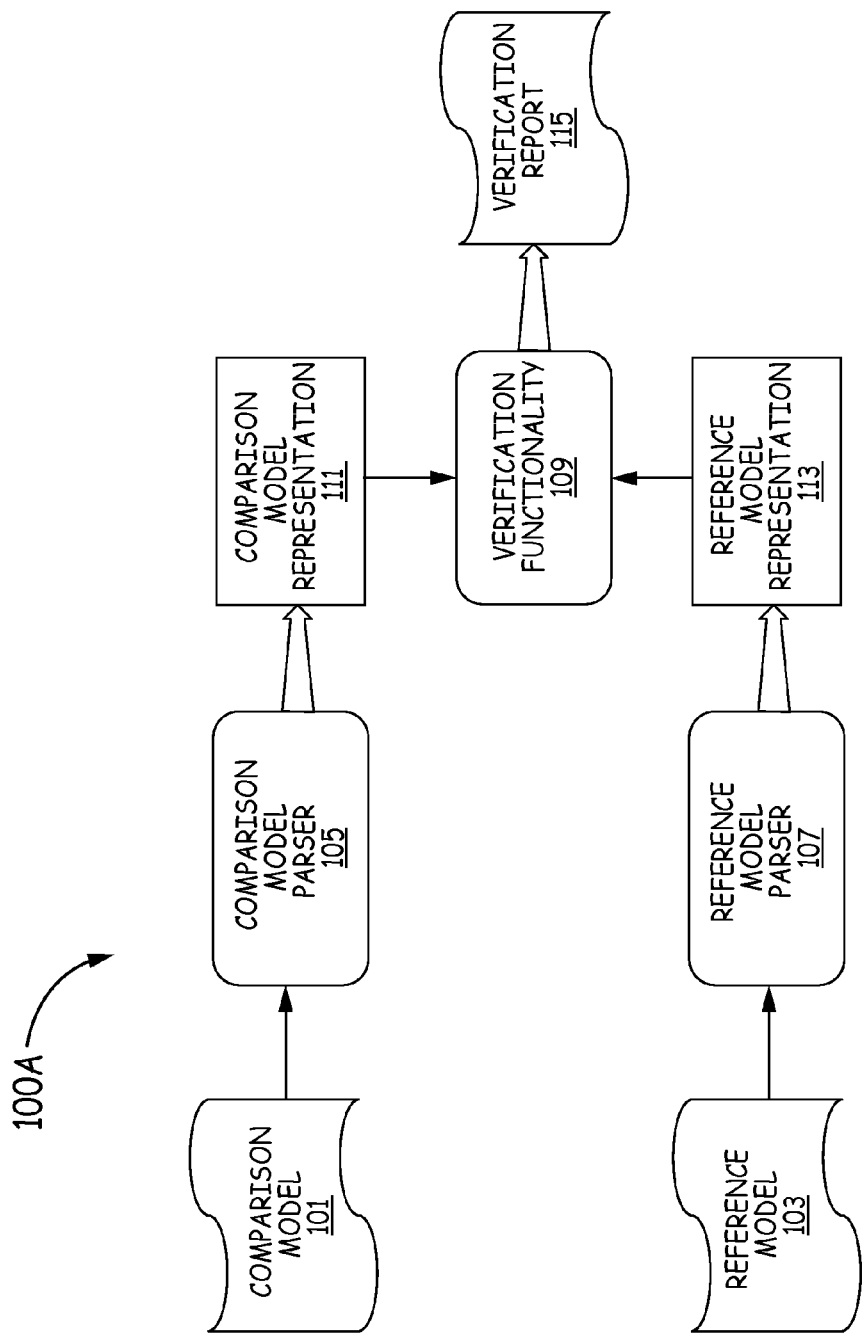

US 9,027,001 B2

SYSTEMS AND METHODS FOR VERIFYING EXPRESSION FOLDING

CROSS-REFERENCE TO RELATED APPLICATIONS

This application is related to the following United States patent applications, all of which are hereby incorporated herein by reference:

U.S. patent application Ser. No. 10/769,535 entitled "AUTOMATIC COMPUTER CODE REVIEW TOOL" filed on Jan. 30, 2004 and which is referred to herein as the '535 application (abandoned); and U.S. patent application Ser. No. 13/180,001 entitled "SYSTEMS AND METHODS FOR VERIFYING MODEL EQUIVALENCE" filed on Jul. 11, 2011 and which is referred to herein as the '001 application (pending).

BACKGROUND

Flight-critical systems such as flight controls are certified to high standards according to guidelines, such as RTCA DO-178B, entitled "Software Considerations in Airborne Systems and Equipment Certification" and published by RTCA, Inc. (formerly known as the Radio Technical Commission for Aeronautics); RTCA DO-254, entitled "Design Assurance Guidance for Airborne Electronic Hardware" and published by RTCA, Inc. (formerly known as Radio Technical Commission for Aeronautics); and EUROCAE ED-12, published by European Organization for Civil Aviation Electronics (EUROCAE). As complexity increases, verification of future avionics systems using traditional manual analysis and testing methods becomes an increasingly difficult task. Model-based design techniques, such as those based on MATLAB® Simulink® and Stateflow® software of The MathWorks, Inc. and SCADE Suite® and Design Verifier™ of Esterel Technologies, Inc., are increasingly adopted within the aerospace industry to aid in management of the increased complexity.

Source code can be created in numerous ways, including manual coding by programmers and automatic generation. Source code generation is the process by which a reference model representation of a system is converted into source code. Source code generators automatically generate source code from the reference model representation of the system. In order to apply source code generators to high criticality software (such as avionics software), the source code is verified to ensure that the auto-generated source code implements the behavior specified by the reference model representation. The RTCA DO-178B and DO-254 guidelines and the EUROCADE ED-12 guidelines specifically require the verification process to show that the source code complies with the reference model representation.

One challenge in automatically verifying compliance of source code to the reference model is the analysis of folded source code statements. Modern source code generators, such as MATLAB® Simulink Coder™ (formerly Real-Time Workshop®) software of The MathWorks, Inc., often optimize the generated code for performance by folding the code. Code folding is an effective strategy for this optimization, wherein multiple code statements are folded into a single statement, thus eliminating the need for creating several temporary variables and potentially simplifying mathematical formulae.

SUMMARY

A system for verifying that a comparison model having folded expressions matches a reference model includes at least one memory device that stores a reference model and a comparison model, wherein the comparison model was previously generated based on the reference model. The reference model adheres to a first set of syntax and semantics, wherein the reference model includes a plurality of first expressions, each of the first expressions including a first operator and a first operand. The comparison model adheres to a second set of syntax and semantics, wherein the comparison model includes a second expression, the second expression including a second operator and a second operand. The system further includes a processing unit configured to match the second expression with the plurality of first expressions.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1A is a functional block diagram depicting one embodiment of a system for verifying a comparison model against a reference model.

Figure 1B:
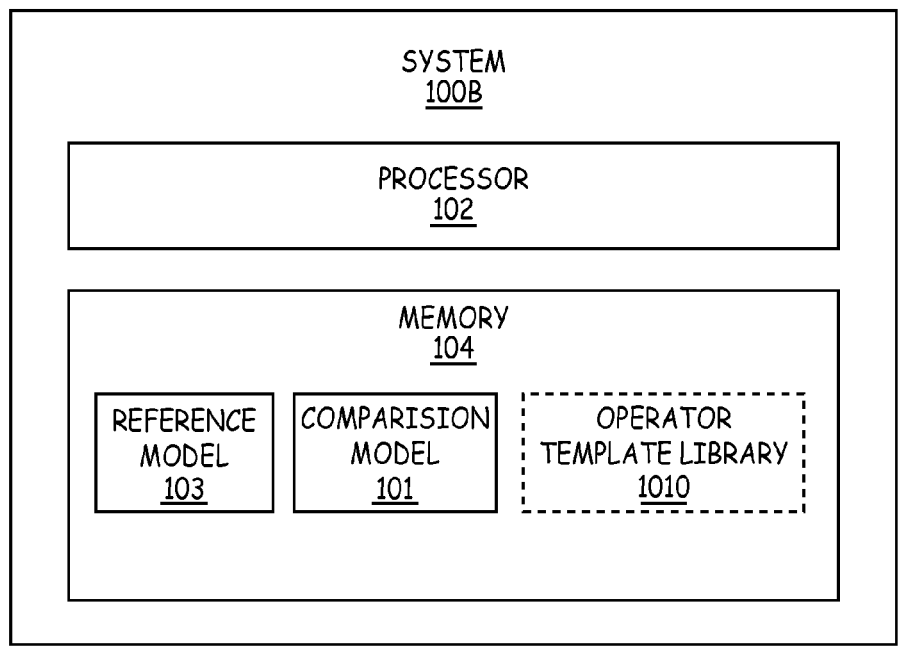
FIG. 1B is a block diagram depicting one embodiment of a system for verifying a comparison model against a reference model.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Throughout the present disclosure, the following terms when used are intended to have the following meanings:

The term "model" used herein refers to a system or structure expressed in a language defined by a consistent set of rules that are used for interpreting the meaning of components in the system or structure. In the context of a process that transforms an input model into an output model, the term "reference model" refers to an input model and the term "comparison model" refers to an output model. In one implementation, both the reference model and the comparison model are represented by different modeling languages, different source code languages, or a combination of modeling languages and source code. In certain embodiments, a reference model and/or a comparison model captures the design of a software system. To accomplish the abstraction from low-level code to analysis, the reference model and/or comparison model is described by a modeling language. Examples of modeling languages and modeling software that can be used to create reference models include MATLAB® Simulink® and Stateflow® software of The MathWorks, Inc.; SCADE Suite® and Design Verifier™ of Esterel Technologies, Inc.; Unified Modeling Language (UML); System Modeling Language (SysML), Human-Usable Textual Notation (HUTN), SAE International's Architecture Analysis and Design Language (AADL), the Eclipse Foundations' Eclipse Modeling Framework (EMF), Object Management Group (OMF)'s Meta-Object Facility (MOF), UML Statechart diagram, Petri Net Models, Khan Process Networks (KPNs), synchronous data flow models, etc.

In some embodiments, modeling languages are defined by concrete syntax, abstract syntax, semantics, abstract syntax mapping and semantic mapping. Concrete and abstract syntax can be represented textually, graphically, or a combination of both textually and graphically. Semantics can be defined formally through the use of formal languages or formal models of computation or informally, by specifying rules for execution or describing the behavior in a natural human language like English. The abstract syntax mapping describes how the concrete syntax and abstract syntax relate to each other. Finally, the semantic mapping assigns semantic meaning to abstract syntax elements.

The concrete syntax of a modeling language specifies how the modeling language represents a reference model in terms of actual characters, letters, or other visual constructs. In contrast to the concrete syntax, the abstract syntax is concerned with the syntax structure. The abstract syntax defines what the elements of the concrete syntax represent. For example, the abstract syntax represents the types of blocks, block attributes, ports expressing hierarchy, and the connections between the blocks and ports. The abstract syntax is concerned about the meaning of the graphical constructs of the concrete syntax, not how they are represented. Further, a concrete syntax representation can be mapped to an abstract syntax representation by the abstract syntax mapping. An abstract syntax representation of the concrete syntax can be in the form of an abstract syntax tree.

The term "source code" used herein refers to text written using format and syntax consistent with a programming language that it's written in that it is an executable description of system software. For example, source code includes high-level languages and other representation of systems. In exemplary embodiments, source code is automatically translated into machine code (such as binary machine code) for execution on a processor (or other processing unit). The translation into binary machine code may occur in a single step or in several steps and may occur at different times. For example, in exemplary embodiments, an interpreter translates the source code to machine code and executes it on the fly. In exemplary embodiments, a compiler translates the source code to machine code and stores the machine code in one or more executable files that can be subsequently executed.

The terms "equivalence" and "compatible" used herein specify a relationship between the reference model and the comparison model in which both the reference model and the comparison model satisfy the same set of constraints and have the same observable behavior. While the reference model and the comparison model are equivalent, certain compatible differences may exist between the reference model and the comparison model. For example, since a float can be stored as a double, if a constraint requires a float data type in the reference model, the comparison model can implement the float data with a double data type and still preserve compatibility. However, if a constraint requires a double data type in the reference model, a float implemented in the comparison model is not a compatible implementation of the double data type because a float fails to store a double without a loss of precision or truncation of data. Rules for compatibility may depend on multitude of factors, including but not limited to, precision, variable types, naming conventions or styles, languages used, etc.

The term "semantically equivalent" used herein refers to a plurality of source code expressions (or statements) that are equivalent, even though they are not identical. For example, the expression "A=B+C" is semantically equivalent to "A=C+B" based on the commutative property (described below). In addition, the expression "A=B+C+D" is semantically equivalent to "A=(B+C)+D" and "A=B+(C+D)" based on the associative property (described below).

The phrase "model transformation" used herein refers to either manual or automated process that follows a set of rules and guidelines to translate the reference model into the comparison model. The phrase "code generation" as used herein is an alternative term used to refer to model transformations, where the comparison model is expressed in the form of source code. The phrase, "model equivalence verification" refers to a process that verifies that a comparison model is a valid representation of a reference model. The phrase "reference model representation" refers to a representation of the reference model that is readily used by model transformation and model equivalence verification processes. The reference model representation is typically, but not necessarily, a computer-based representation. The term "comparison model representation" refers to a representation of the comparison model that is readily used by the model transformation and model equivalence verification processes. The comparison model representation is typically, but not necessarily, a computer-based representation. The term "reference model parser" refers to a process that follows specific rules to create a reference model representation from a reference model. For example, reading the reference model from a file, and creating a machine readable reference model representation in a computer's memory is one embodiment of a reference model parser. The term "comparison model parser" refers to a process that creates a comparison model representation from the comparison model following specific rules. In some embodiments, a comparison model parser includes reading a comparison model from a file and creating a machine readable comparison model representation in a computer's memory. In some implementations, the reference model parser may function like the comparison model parser with the exception of differences implied as above with reference to the different formats of the reference model and the comparison model.

The phrase "source code generation" used herein refers to the process by which a reference model is converted into a comparison model that is embodied in source code. Source code generation can either be automatic using a source code generator or manually done. "Source code generators" generate source code from reference models of the systems automatically.

The term "modeling construct", "modeling element", and "block" are used interchangeably herein and refers to a semantic unit consisting of a group of one or more declarations and statements. Modeling constructs can be in both the reference model and the comparison model. In exemplary embodiments, modeling constructs manipulate data. The term "parameter" used herein refers to a property of a modeling construct. The phrase "data dependency" used herein refers to a modeling construct that references data in a different modeling construct. The term "formula" used herein refers to an algorithmic processing of an assignment of data values.

In exemplary embodiments using MATLAB® Simulink® and other models, modeling constructs are blocks that manipulate signals, such as inputs and outputs. In exemplary embodiments, modeling constructs include connective elements that connect the modeling construct to other modeling constructs. Examples of blocks include gain blocks, sum blocks, add blocks, subtract blocks, product blocks, dot product blocks, polynomial blocks, sqrt (square root) blocks, mux (multiplexer) blocks, inport blocks, outport blocks, switch blocks, derivative blocks, integrator blocks, comparison blocks, abs (absolute value) blocks, assignment blocks, divide blocks, unary minus blocks (negate input), trigonometric function blocks, bitwise operator blocks, logical operator blocks, etc.

The term "connective element" used herein refers to a component part of a modeling construct that connects modeling constructs together. In exemplary embodiments using MATLAB® Simulink® and other models, connective elements include ports on blocks which either receive input signals or transmit output signals. The term "port" used herein refers to a component part of a modeling construct that interfaces between a block and a signal. In exemplary embodiments using MATLAB® Simulink® and other models, ports include input ports and outputs ports. Ports interfacing with input signals are input ports and ports interfacing with output signals are output ports.

Software is increasingly being designed using model-based design methods. Once software is designed in a modeling environment based on a reference model, the use of a model transformation changes a reference model into a comparison model. Alternatively, multiple transformations are used to transform a reference model into a comparison model, where the comparison model is used for another model transformation. For example, multiple transformations are used to analyze different aspects of a reference model. One transformation changes the reference model into a comparison model to analyze one set of properties of the reference model, while a different transformation changes the reference model to analyze a different set of properties of the reference model.

For certain platforms, the generated code is verified against the reference model to show that the source code complies with the reference model. For example, software designed for flight-critical systems in aircraft is certified according to RTCA DO-178B, DO-178C, and DO-254 guidelines and the EUROCADE ED-12 guidelines. Further, in some implementations, the verification process must be fully independent of the design process. In exemplary systems described herein, the comparison model is verified against the reference model by comparing the comparison model representation against the reference model representation.

Further, unlike syntax based checkers, the exemplary systems described herein are able to comprehend low-level requirements, as described in RTCA DO-178B, even as complexity increases. Syntax-based implementations of model equivalence verification generally focus on syntax verification, relying on strict modeling styles, formats, and standards, and the performance of low-level comparisons between the comparison model and low-level requirements. As complexity increases, syntax-based checkers become unable to comprehend low-level requirements because of their inability to capture the semantics of reference models. Furthermore, if the style or format of the comparison model changes, a syntax-based checker is unable to compare the new form of the comparison model with the reference model. Folded expressions further increase the complexity of syntax based checkers because they now need to account for all the possible ways in which expressions can be folded. The same challenge also exists with semantically equivalent but syntactically different expressions like those generated using the properties of commutativity and associativity. All possible semantically equivalent expressions must be accounted for in the syntax checker.

In another implementation, the model transformation process functions as a code generator by generating code based on a reference model to be implemented on a destination platform. When the model transformation functions as a code generator, the phrases "source code" and "comparison model" are interchangeable, as generated source code is an embodiment of a comparison model. Code generators can generate source code form a reference model into programming languages like C, C++, C#, Objective C, Ada, Java, Python, Ruby, HTML, Flash, Prolog, Haskell, and the like. Code can also be generated to run on middleware platforms such as COBRA, J2EE, ICE, SOAP, .NET, COM, RPC, and the like. Code generated may also include bytecode or shell scripts that can readily execute on a target platform, or potentially on a virtual machine such as the Java VM, VMware desktop software, and the like. Code generation is performed by a computer implemented application or through manual source code development performed by a human.

The term "operator" refers to any mathematical operation, such as "+" for summation, "−" for subtraction, "·" for multiplication, "/" for division, etc. The term "operand" refers to the entity in a mathematical formula upon which operations are performed, such as variable in code, inputs in modeling constructs, etc.

The term "sub-expression" used herein refers to an element that can be represented as a mathematical formula having one operator and at least one operand, such as the following: "2·A", "A·B", "A·B·C", "A+2", "A+B", "A+B+C", and "A+B+C+4". The term "expression" used herein refers to an element that can be represented as a mathematical formula including at least one operator and at least one operand, such as the following: "A+B·C", "2·A+4·B", and "A=2·A+B". An expression comprises one or more sub-expressions.

The phrases "code folding", "folding", "folded code", "folded source code", "folded code statement", "folded source code statement", "folded mathematical expressions", "folded mathematical operations", "folded logical expressions", "folded expressions", and "folded logical operations" used herein refer to combining one or more sub-expressions into a single expression. For example, a series of mathematical expressions could be folded into a single expression. For example, the two expressions "A=B+C" and "C=D·E" can be folded into the following expression: "A=B+D·E". Code folding can be used to combine multiple mathematical expressions into a single, compatible mathematical expression. In exemplary embodiments implementing source code, code folding can eliminate the need to create several temporary variables in source code.

The phrases "operator precedence", "order of operation", "operator precedence", and "mathematical operator precedence" used herein refer to a set of rules that define the order in which operations should be performed in a given expression (or sub-expression). In exemplary embodiments, the order of operator precedence used is generally (but not necessarily) aligned with the order in which mathematical expressions are evaluated. In exemplary embodiments, the order of operator precedence may include: (1) terms denoted within indications of operator precedence (such as terms inside parentheses in C or C++ code); (2) exponents and roots; (3) multiplication and division; and (4) addition and subtraction. In other exemplary embodiments, the levels of operator precedence will be more complex, such as including the following levels of operator precedence: (1) INVALID, ARRAY, FUNCTION, POSTFIXMINUSMINUS, POSTFIXPLUSPLUS, SELECTVIANAME, SELECTVIAPTR; (2) ADDRESS, BITWISECOMPLEMENT, NEGATION, POINTER, PREFIXMINUSMINUS, PREFIXPLUSPLUS, SIZEINBYTES, TYPECAST, UNARYMINUS, UNARYPLUS; (3) DIVIDE, MOD, MULTIPLY; (4) MINUS, PLUS; (5) BITWISESHIFTLEFT, BITWISESHIFTRIGHT; (6) GREATERTHAN, GREATERTHANEQUALTO, LESSTHAN, LESSTHANEQUALTO; (7) EQUALTO, NOTEQUALTO; (8) BITWISEAND; (9) BITWISEEXCLUSIVEOR; (10) BITWISEINCLUSIVEOR; (11) LOGICALAND; (12) LOGICALOR; (13) TERNARYCONDITIONAL; (14) ADDASSIGNMENT, ASSIGNMENT, BITANDASSIGNMEENT, BITEXORASSIGNEMNT, BITINORASSIGNEMNTS, BITSHIFTLEFTASSIGNMENT, BITSHIFTRIGHTASSIGNMENT, DIVASSIGNMENT, MODASSIGNMENT, MULASSIGNMENT, SUBASSIGNMENT; (15) COMMA. In exemplary embodiments using the above list of operator precedence, operators that belong to precedence levels (2), (13), and (14) are evaluated right-to-left, whereas all other operators are evaluated from left to right.

The phrases "indications of operator precedence" and "indication of operator precedence" used herein refer to elements of mathematical formulae or source code that are used to identify operator precedence. For example, the parentheses in the following expression indicate that the sub-expression within the parentheses must be evaluated before the other sub-expressions of the expression: "A=(B+C)·D".

The phrases "unnecessary indications of operator precedence" and "unnecessary indication of operator precedence" used herein refer to indications of operator precedence used where a particular expression would be equivalent with or without all the corresponding indications of operator precedence at issue, based on the rules of operator precedence defined for the mathematical formula or source code. For example, the parentheses in the following expression are unnecessary indications of operator precedence in mathematical formulae because a product has a higher operator precedence than a sum: "A=(B·C)+D".

The terms "commutative", "commutatively", and "commutativity" used herein refer to operations where the end result is not changed when the order of the operands are changed according to the commutative property or commutative law. Multiplication and addition are generally commutative operations. In contrast, division and subtraction are not commutative operations. For example, the expressions "A=B+C" and "A=C+B" are equivalent based on commutativity.

The terms "associative", "associatively", and "associativity" used herein refer to expressions where the order in which the operations are performed does not matter as long as the sequence of the operands is not changed where there are two or more occurrences in a row of the same associative operator according to the associative property or associative law. For example, parentheses in an associative expression can be rearranged without changing its value. For example, the expressions "A=B+C+D", "A=(B+C)+D", and "A=B+(C+D)" are equivalent based on associativity.

While folded source code can optimize the auto-generated source code generated by source code generators (as well as manually generated source code), it presents a few challenges to verification of code. First, arbitrary or unnecessary indications of operator precedence in the source code (such as parentheses used in mathematical formulae or certain source code) can cause difficulties in verifying the compatible equivalence between the reference model and the comparison model. In exemplary embodiments where the comparison model is source code, the source code for a particular programming language (such as C or C++) adheres to a set of syntax and a set of semantics including a set of rules of operator precedence. These arbitrary or unnecessary indications of operator precedence may be added even though they are not necessary. In exemplary embodiments, the verification of the code occurs properly irrespective of whether arbitrary or unnecessary indications of operator precedence (such as parenthesis in mathematical formulae or source code) are present in either the comparison model or the reference model.

Second, rules of commutativity and associativity allow rearranging the order that some operations are performed without changing the end result of an expression. In exemplary embodiments, the verification of the code occurs properly irrespective of the ordering of operations that allow for variations on order of operation according to the rules of commutativity and associativity.

FIG. 1A is a functional block diagram depicting a system 100A for verifying a comparison model 101 having folded expressions with a reference model 103. System 100A verifies that the comparison model 101 and the reference model 103 are compatible with the same set of rules and constraints. To perform the verification of comparison model 101, the system 100A includes a comparison model parser 105, a reference model parser 107 and verification functionality 109. In exemplary embodiments, the comparison model parser 105 receives the comparison model 101 as an input and generates a comparison model representation 111. In exemplary embodiments, the reference model parser 107 receives the reference model 103 as an input and generates a reference model representation 113. In exemplary embodiments, the verification functionality 109 verifies that the comparison model representation is compatible with the reference model representation. In exemplary embodiments, a verification report 115 is generated describing the results of the verification performed by the verification functionality 109.

FIG. 1B is a block diagram depicting a system 100B for verifying a comparison model 101 having folded expressions with a reference model 103. The system 100B includes a processor 102 (or other processing unit) communicatively coupled to a memory 104. In the exemplary system 100B, the processor 102 includes or functions with software programs, firmware, or other computer readable instructions for executing various methods, process tasks, calculations, and control functions, used in implementing the functionality described herein. In exemplary embodiments, the processor 102 implements the comparison model parser 105, the reference model parser 107, and the verification functionality 109 described above with reference to FIG. 1A.

In the exemplary system 100B, the memory 104 is configured to store at least one reference model 103 and at least one comparison model 101. In exemplary embodiments of system 100B, the reference model 103 is a model based representation of a system that can be implemented using computer executable source-code. In exemplary embodiments of system 100B, the reference model 103 adheres to a first set of syntax and semantics that define the reference model. In exemplary embodiments, the semantics include abstract syntax and mathematical specifications, such as operators, operands, expressions, and ordering between expressions. In generic exemplary embodiments, the reference model 103 includes at least one expression with one sub-expression. In more specific exemplary embodiments, the reference model 103 is a data flow model and the expressions and sub-expressions include blocks and connections. While specific exemplary embodiments are described herein, it is understood that the principles described apply to reference models generally.

In exemplary embodiments, the reference model 103 is a Simulink® diagram generated using Simulink® software from The MathWorks, Inc. In other exemplary embodiments, the reference model 103 is a Stateflow® chart generated using Stateflow® software from The MathWorks, Inc. In other exemplary embodiments, the reference model 103 is a MATLAB® function generated using MATLAB® software from The MathWorks, Inc. In other exemplary embodiments, the reference model 103 is defined using other syntax and semantics and other programming languages and/or other software is used to generate the reference model 103.

In exemplary embodiments, the reference model 103 includes at least one modeling construct having at least one connective element. In exemplary embodiments, the modeling constructs are blocks in a Simulink® diagram generated using Simulink® software from The MathWorks, Inc. In exemplary embodiments, the connective elements are ports on blocks in a Simulink® diagram generated using Simulink® software from The MathWorks, Inc.

In generic exemplary embodiments, the comparison model 101 includes at least one expression with one or more sub-expressions. In more specific exemplary embodiments, the comparison model is source code and the expressions and sub-expressions include operators, variables, sub-expressions, expressions and parenthesis. While specific exemplary embodiments relating to source code are described herein, it is understood that the principles described apply to comparison models generally.

In exemplary embodiments of system 100B, the comparison model 101 is source code that was previously generated from the reference model 103 by a source code generator. In other exemplary embodiments, the comparison model 101 is source code that was generated manually. In exemplary embodiments, the source code adheres to a second set of syntax and semantics. In exemplary embodiments, the semantics include abstract syntax and mathematical specifications, such as operators, operands, expressions, sub-expressions, and indications of operator precedence. In exemplary embodiments, the source code includes at least one sub-expression having one operator and at least one variable.

In exemplary embodiments, the operator in the sub-expression in the source code corresponds to the modeling construct in the reference model 103 (such as a block) and the at least one variable in the source code represents the at least one connective element (such as a port). In yet other exemplary embodiments, the comparison model 101 is a model represented using different syntax and semantics from the reference model 103.

In exemplary embodiments where the comparison model 101 is source code, the source code adheres to rules of operator precedence contained within the second set of syntax and semantics. In exemplary embodiments, the source code is written using C, C++, C#, Java, or PHP. In other embodiments, the source code is another type of source code other than those listed above. In exemplary embodiments, the rules of operator precedence are defined by standards applicable to the comparison model 101. In exemplary embodiments, the source code generator is Simulink® Coder™ (formerly Real-Time Workshop®) software available from The MathWorks, Inc. In other exemplary embodiments, the source code generator is MATLAB® Coder™ software available from The MathWorks, Inc. In other exemplary embodiments, the source code generator is other software.

In exemplary embodiments, the processor 102 is configured to match at least one variable in the source code to either a modeling construct (such as a block in a Simulink® model) or a connective element of a modeling construct (such as a port of a block in a Simulink® model) of the reference model 103. In exemplary embodiments where the comparison model is source code, this is done using comments in the source code that help identify the ports and blocks of the reference model 103 to which the variables in the comparison model 101 correspond. For example, one line of code for a variable declaration may have comments that indicate which connective element or which modeling element the variable corresponds to in the reference model 106.

In other embodiments, the source code generator itself uses defined rules to generate the variables in the comparison model 101. These defined rules can then be leveraged during variable matching to correctly identify the modeling constructs of the reference model 103. Thus, the naming of the variable can be such that it is possible to identify connective element of a modeling construct (such as a port of a block) that it represents and/or the modeling construct (such as a block) to which it is associated. In other embodiments, the source code generator keeps the actual structure of the reference model 103 in the code. For example, a class programming language construct could be generated for each modeling construct (such as a block) in the comparison model 101.

In exemplary embodiments, the processor 102 implements a comparison model parser 105 with comparison logic that is further configured to remove unnecessary indications of operator precedence from expressions (including sub-expressions) in the comparison model 101. In exemplary embodiments, indications of operator precedence are unnecessary when a particular expression would be equivalent with or without the indications of operator precedence, based on the rules of operator precedence defined for the comparison model 101.

In exemplary embodiments, the processor 102 implements a comparison model parser 105 with comparison logic that is further configured to verify that the operator of the sub-expression of the comparison model 101 matches the modeling construct in the reference model 103 and that the at least one variable matches the at least one connective element of the modeling construct of the reference model 103. In exemplary embodiments, the verification is done for all sub-expressions of the comparison model 101 and all modeling constructs in the reference model 103 to verify equivalence between the entire reference model 103 and the comparison model 101.

In exemplary embodiments of the exemplary system 100B, the memory 104 also includes optional operator template library 110. In other embodiments, the optional operator template library 110 is stored in other places. In exemplary embodiments, the processor 102 implements a comparison model parser 105 with comparison logic that is configured to access the operator template library 110 to identify acceptable matches between the operator of the sub-expression of the comparison model 101 and the modeling construct in the reference model 103. In exemplary embodiments, the operator template library 110 is generated previously based on an understanding of the syntax and semantics of both the reference model 103 and the comparison model 101. The operator template library 110 identifies a set of modeling constructs (such as mathematical operators, blocks, or source code operators) in the comparison model 101 that map to a particular modeling construct (such as mathematical operators, blocks, or source code operators) in the reference model 103. In an embodiment where the reference model 103 is described in a modeling language and the comparison model 101 is described in source code, the operator template library 110 identifies a set of modeling constructs (such as blocks) in the reference model 103 that match to a particular operator in the comparison model 101. In exemplary embodiments, the operator template library 110 maps the operator of the sub-expression available for use in the comparison model 101 with at least one modeling construct of the reference model 103. For example, the operator template library 110 may identify that a "+" operator in the comparison model 101 matches to a sum block in the reference model 103. In some instances, the operator template library 110 maps the operator of the sub-expression available for use in the comparison model 101 with a plurality of modeling constructs of the reference model 103. For example, the operator template library 110 may identify that a "·" operator in the comparison model 101 matches to either a product block or a gain block in the reference model 103.

In one embodiment, an expression tree is first created from the comparison model 101. An expression tree is a hierarchical representation of operators. In one implementation, the highest precedence operator is at the root level. In this implementation, the highest precedence operator includes children that are at the next level of operator precedence. In one embodiment, matching is performed by walking through the tree from the root to the leaves. This expression tree embodiment enables matching of the currently highest precedence operation between the comparison model and the reference model. At times, there are situations where operators have the same precedence. In these situations, expression evaluation order precedence is applied. In example implementations, the expression evaluation order can be either left to right or right to left. In example implementations, additions and subtractions are performed from left to right, but typecasting and/or unary operations are performed right to left. In exemplary embodiments, expression trees enable unambiguous representation of expressions in the comparison model enabling a matching algorithm to match operators in order, ensuring proper matching.

FIGS. 2A-2F are block diagrams depicting reference models having sum and gain blocks. Each of FIGS. 2A-2F shows a different reference model, labeled model 200A-200F respectively.

Figure 2A:
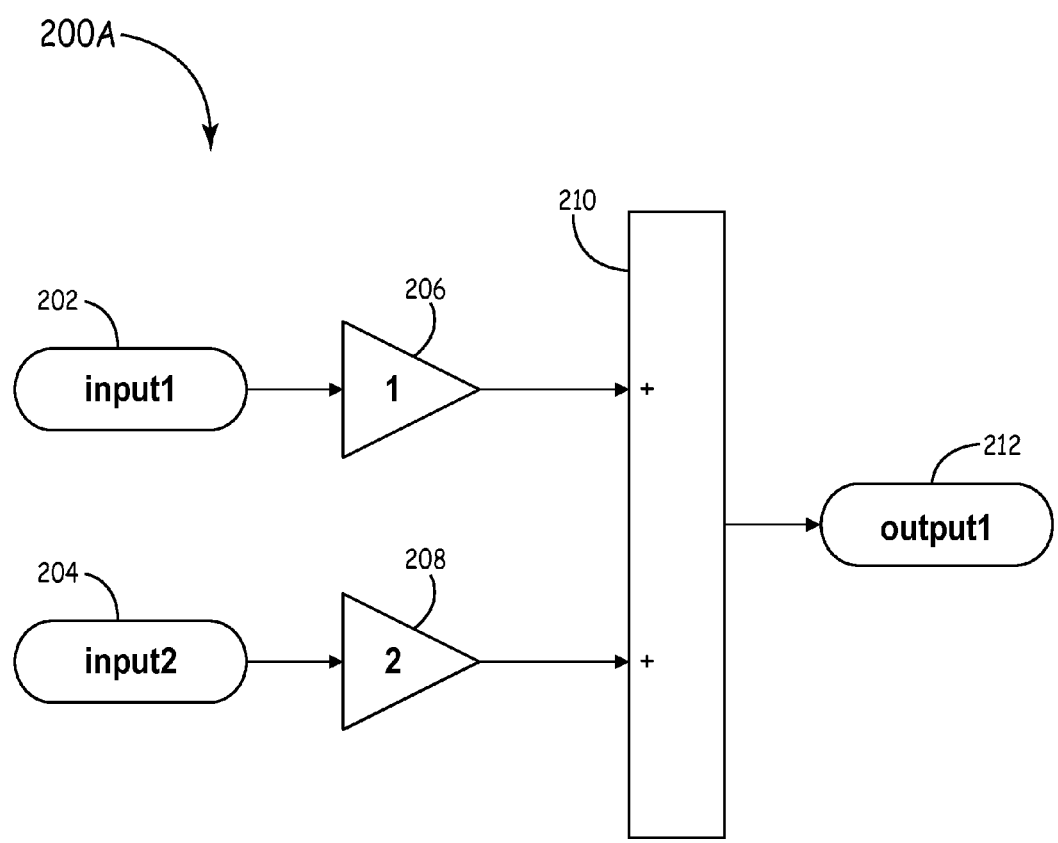
FIGS. 2A-2F are block diagrams depicting reference models having sum and gain blocks.

FIG. 2A is a block diagram of a reference model 200A including input 202, input 204, gain block 206, gain block 208, sum block 210, and output 212. Input 202 and input 204 are inputs into the reference model 200A. Gain block 206 receives input 202 and gain block 208 receives input 204. Gain block 206 and gain block 208 each have associated gains. Specifically, gain block 206 has a gain of 1 and gain block 208 has a gain of 2. Thus, gain block 206 multiplies signal values received through input 206 by 1 and gain block 208 multiplies signal values received through input 204 by 2. Sum block 210 receives and sums outputs from gain block 206 and gain block 208 and outputs the sum as output 212.

Reference model 200A shown in FIG. 2A can be represented by a mathematical expression, such as:

$$\text{output1} = 1 \cdot \text{input1} + \text{input2} \cdot 2 \qquad 1.$$

where input1 equals input 202, input2 equals input 204, and output1 equals output 212.

The mathematical expression above can be verified according to the system and method described herein. In exemplary embodiments, an expression tree is created from the original mathematical expression as described above. First, parameter "input1" can be matched to the input port of the gain block 206 that receives input 202 or the gain block 206 generally; parameter "input2" can be matched to the input port of the gain block 208 that receives input 204 or the gain block 208 generally; and parameter output1 can be matched to the output port of the sum block 210 that outputs to output 212 or the sum block 210 generally. Second, any unnecessary indications of operator precedence from the sub-expressions can be removed. The mathematical expression does not include any unnecessary indications of operator precedence.

A first sub-expression "1·input1" can be matched with the input port of gain block 206 that receives input 202 and/or gain block 206 (having a value of 1); a second sub-expression "input2·2" can be matched with the input port of gain block 208 that receives input 204 and/or gain block 208 (having a value of 2); a third sub-expression "subex1+subex2" (where subex1 is the output of the first sub-expression "1·input1" and subex2 is the output of the second sub-expression "input2·2") can be matched with the input ports of sum block 210 that receive the inputs from the outputs of gain block 206 and gain block 208 or with the sum block 210 generally; and a fourth sub-expression "output1=subex3" (where subex3 is the output of the third sub-expression "subex1+subex2") can be matched with the output port of sum block 210 that outputs to output 212 or with sum block 210 generally. Thus, each component element of reference model 200A can be verified with the mathematical expression above. In some implementations, the order of operations implies a dependency, or connections, between the various modeling elements. In implementations, it is verified that the gain blocks appear before the sum block in the reference model by verifying the higher precedence operators first.

Figure 2B:
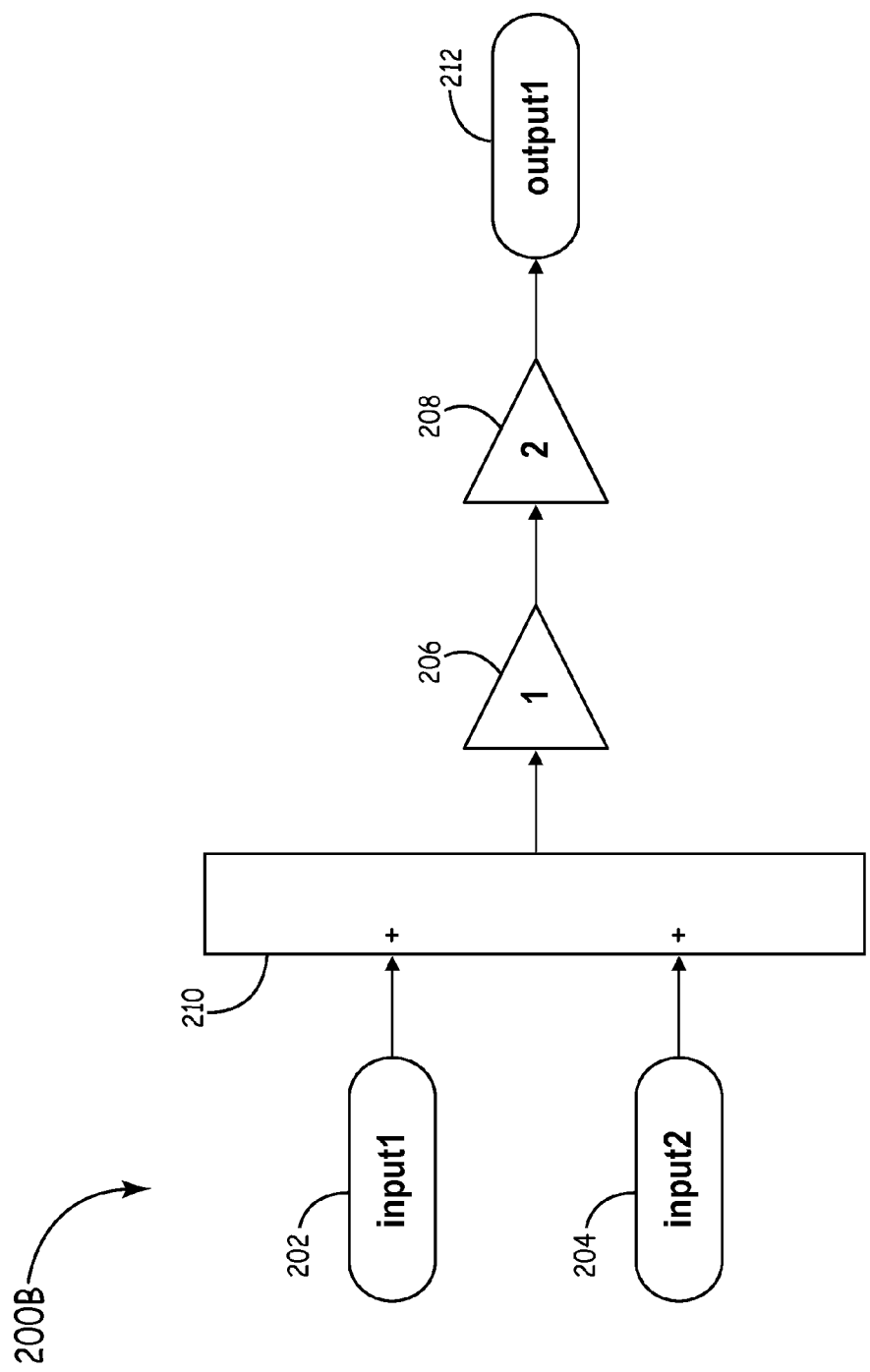

FIG. 2B is a block diagram of a reference model 200B including input 202, input 204, sum block 210, gain block 206, gain block 208, and output 212. Input 202 and input 204 are inputs into the reference model 200B. Sum block 210 receives and sums input 202 and input 204 and outputs the sum to gain block 206. Gain block 206 has a gain of 1. Thus, gain block 206 multiplies the output of sum block 210 and outputs it to gain block 208. Gain block 208 has a gain of 2. Thus, gain block 208 multiplies the output of gain block 206 and outputs it as output 212.

Reference model 200B shown in FIG. 2B can be represented by semantically equivalent mathematical expressions, such as:

$$\text{output1}=(\text{input1}+\text{intput2})\cdot 1\cdot 2 \qquad 1.$$

$$\text{output1}=(1\cdot(\text{input1}+\text{input2}))\cdot 2 \qquad 2.$$

where input1 equals input 202, input2 equals input 204, and output1 equals output 212. Based on rules of operator precedence for the reference model 200B, the second mathematical expression above is semantically equivalent to the first mathematical expression above and the additional parentheses separating expression "1·(input1+input2)" from expression "·2" are redundant.

The first and second mathematical expressions above can be verified according to the system and method described herein. First, parameter "input1" can be matched to the input port of the sum block 210 that receives input 202 or the sum block 210 generally; parameter "input2" can be matched to the input port of the sum block 210 that receives input 204 or the sum block 210 generally; and parameter "output1" can be matched to the output port of gain block 208 that outputs to output 212 or the gain block 208 generally. Second, any unnecessary indications of operator precedence from the sub-expressions can be removed. The first mathematical expression above does not include any unnecessary indications of operator precedence. The second mathematical expression above does include unnecessary indications of operator precedence. Once these unnecessary indications of operator precedence are removed, the second mathematical expression above would be "output1=1·(input1+input2)·2".

A first sub-expression "input1+input2" of the first and second mathematical expressions above can be matched with the input ports of the sum block 210 that receive input 202 and input 204 and/or sum block 210; a second sub-expression "1·subex1·2" or "subex1·1·2" equivalently (where subex1 is the output of the first sub-expression "input1+input2") can be matched with the output port of the sum block 210, the gain block 206, and the gain block 208; and a third sub-expression "output=subex2" (where subex2 is the output of the second sub-expression "subex1·1·2" or "1·subex1·2") can be matched with the output of gain block 208 that outputs to output 212 and/or with gain block 208. Thus, each component element of reference model 200B can be verified with the mathematical expressions above. In some implementations, the highest precedence sub-expression first policy also automatically verifies the ordering in the comparison model with that in the reference model. In implementations, it is automatically verified that the sum block appears before the gain blocks in the model, simply by verifying the highest precedence sub-expression "input1+input2" first. By following the operator precedence ordering in the code, it can automatically be verified that the order is consistent with the ordering of modeling elements in the model. Note that the ordering between the two gain blocks is irrelevant because of associativity of multiplication, and hence we collectively match the entire sub-expression "1·subex1·2" or "subex1·1·2" to the two gain blocks without matching them one-by-one in order.

Figure 2C:
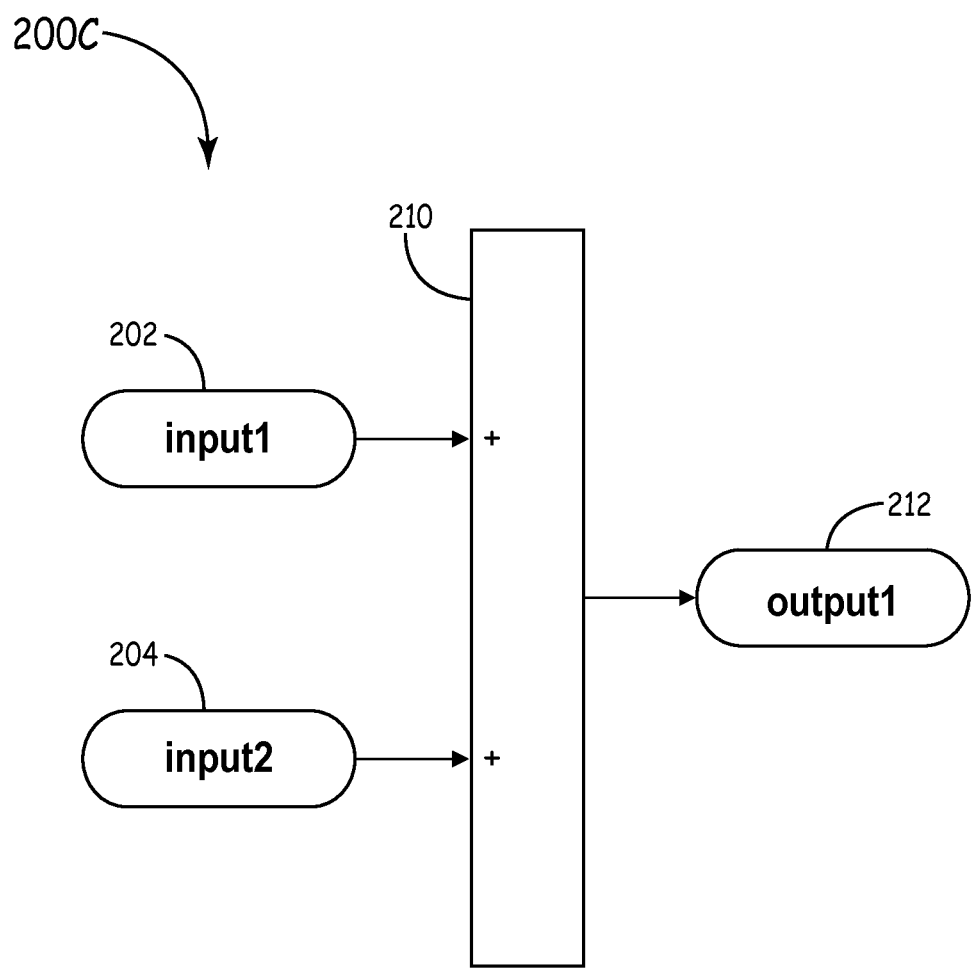

FIG. 2C is a block diagram of reference model 200C including input 202, input 204, sum block 210, and output 212. Input 202 and input 204 are inputs into the reference model 200C. Sum block 210 receives and sums input 202 and input 204 and outputs the sum as output 212.

Reference model 200C shown in FIG. 2C can be represented by mathematical expressions, such as:

$$\text{output1}=\text{input1}+\text{input2} \qquad 1.$$

$$\text{output1}=\text{input2}+\text{input1} \qquad 2.$$

where input1 equals input 202, input2 equals input 204, and output1 equals output 212. Based on commutativity, either of the above mathematical expressions match reference model 200C shown in FIG. 2C.

Both mathematical expressions above can be verified according to the system and method described herein. First, parameter "input1" can be matched to the input port of the sum block 210 that receives input 202 or the sum block 210 generally; parameter "input2" can be matched to the input port of the sum block 210 that receives input 204 or the sum block 210 generally; and "output1" can be matched to the output port of the sum block 210 or the sum block 210 generally. Second, any unnecessary indications of operator precedence from the sub-expressions can be removed. Neither mathematical expressions include any unnecessary indications of operator precedence.

A first sub-expression "input1+input2" of the first mathematical expression and a second sub-expression "input2+input1" of the second mathematical expression can be matched with the input ports of sum block 210 that receive input 202 and input 204 and/or the sum block 210 generally; a second sub-expression "output=subex1" of the mathematical expressions (where subex1 is the output of the first sub-expression "input1+input2" or "input2+input1") can be matched with the output port of the sum block 210 that outputs to output 212. Thus, each component element of reference model 200C can be verified with the mathematical expressions above. Note that we do not care about the order of parameters in the first sub-expression above because of the commutativity of addition.

Figure 2D:
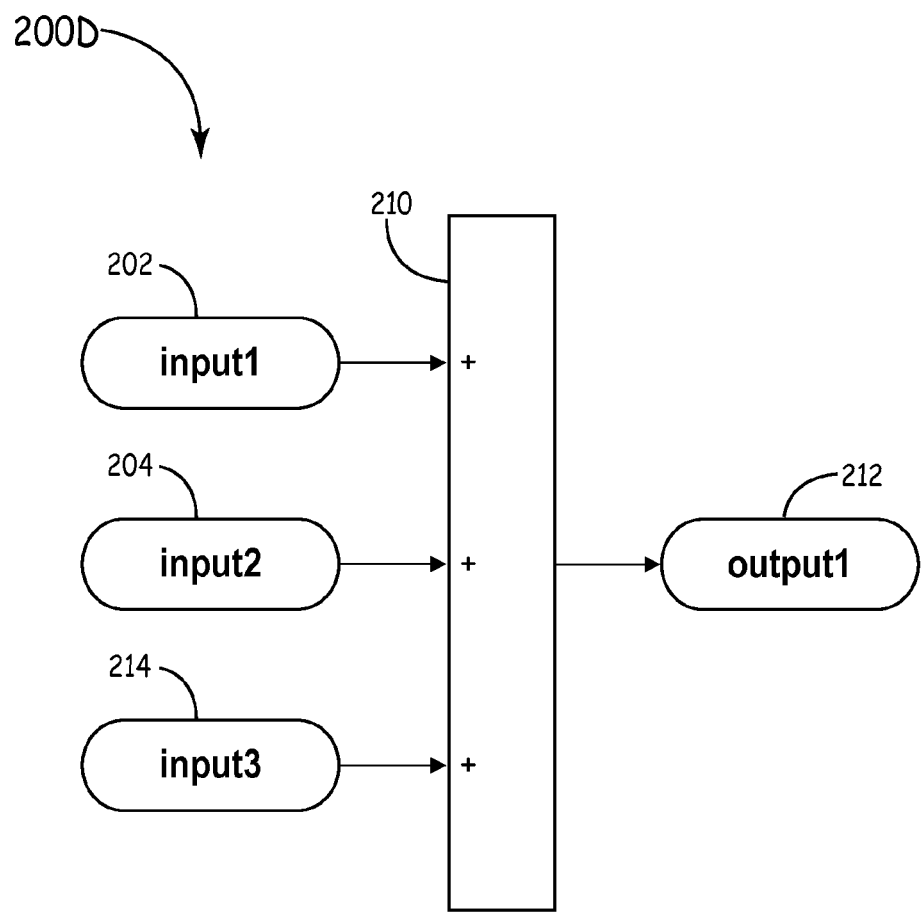

FIG. 2D is a block diagram of reference model 200D including input 202, input 204, input 214, sum block 210, and output 212. Input 202, input 204, and input 214 are inputs into the reference model 200D. Sum block 210 receives and sums input 202, input 204, and input 214 and outputs the sum as output 212.

Reference model 200D shown in FIG. 2D can be represented by mathematical expressions, such as:

$$\text{output1}=\text{input1}+\text{input2}+\text{input3} \qquad 1.$$

$$\text{output1}=(\text{input1}+\text{input2})+\text{input3} \qquad 2.$$

$$\text{output1}=\text{input1}+(\text{input2}+\text{input3}) \qquad 3.$$

where input1 equals input 202, input2 equals input 204, input3 equals input 214, and output1 equals output 212. Based on associativity, any of the above mathematical expressions match reference model 200D shown in FIG. 2D.

All three mathematical expressions above can be verified according to the system and method described herein. First, parameter "input1" can be matched to the input port of sum block 210 that receives input 202 or the sum block 210 generally; parameter "input2" can be matched to the input port of sum block 210 that receives input 204 or the sum block 210 generally; parameter "input3" can be matched to the input port of sum block 210 that receives input 214 or the sum block 210 generally; and parameter "output1" can be matched to the output port of the sum block 210 that outputs to output 212 or the sum block 210 generally. Second, any unnecessary indication of operator precedence from the sub-expressions can be removed. The first and third mathematical expressions do not include any unnecessary indications of operator precedence. The indications of operator precedence in the third mathematical expression are necessary because the operator ordering is from left-right for the "+" operator. This means that without the parenthesis, "input1+input2" will be performed first, and the result of this addition will be added to input3. So, in this case, the parenthesis is changing the precedence and therefore it is a necessary indication of operator precedence. In contrast, the second mathematical expression above includes unnecessary indications of operator precedence. Once these unnecessary indications of operator precedence are removed, the second mathematical expression above will equal the first mathematical expression "output1=input1+input2+input3".

With regards to the first and second mathematical expressions, a first sub-expression "input1+input2+input3" of the normalized mathematical expression can be matched with the input ports of sum block 210 that receive inputs 202, 204, and 214 and/or the sum block 210; a second sub-expression "output=subex1" of the first and second mathematical expressions above (where subex1 is the output of the first sub-expression "input1+input2+input3") can be matched with the output port of sum block 210 that outputs to output 212 and/or with sum block 210. Note that the ordering between the two sum operators is irrelevant because of associativity of addition, and hence we collectively match the entire sub-expression "input1+input2+input3" to the sum block 210 without matching them one-by-one in order.

With regards to the third mathematical expression, a first sub-expression "input2+input3" of the normalized mathematical expressions can be matched with the input ports of the sum block 210 that receive input 204 and input 214 and/or the sum block 210; a second sub-expression "input1+subex1" of the normalized mathematical expression (where subex1 is the output of the first sub-expression "input2+input3") can be matched with the input port 202 of sum block 210 and/or the sum block 210; a third sub-expression "output=subex2" of the third mathematical expression above (where subex2 is the output of the second sub-expression "input1+subex1") can be matched with the output port of sum block 210 that outputs to output 212 and/or with sum block 210. Thus, each component element of reference model 200D can be verified with the mathematical expressions above.

Figure 2E:
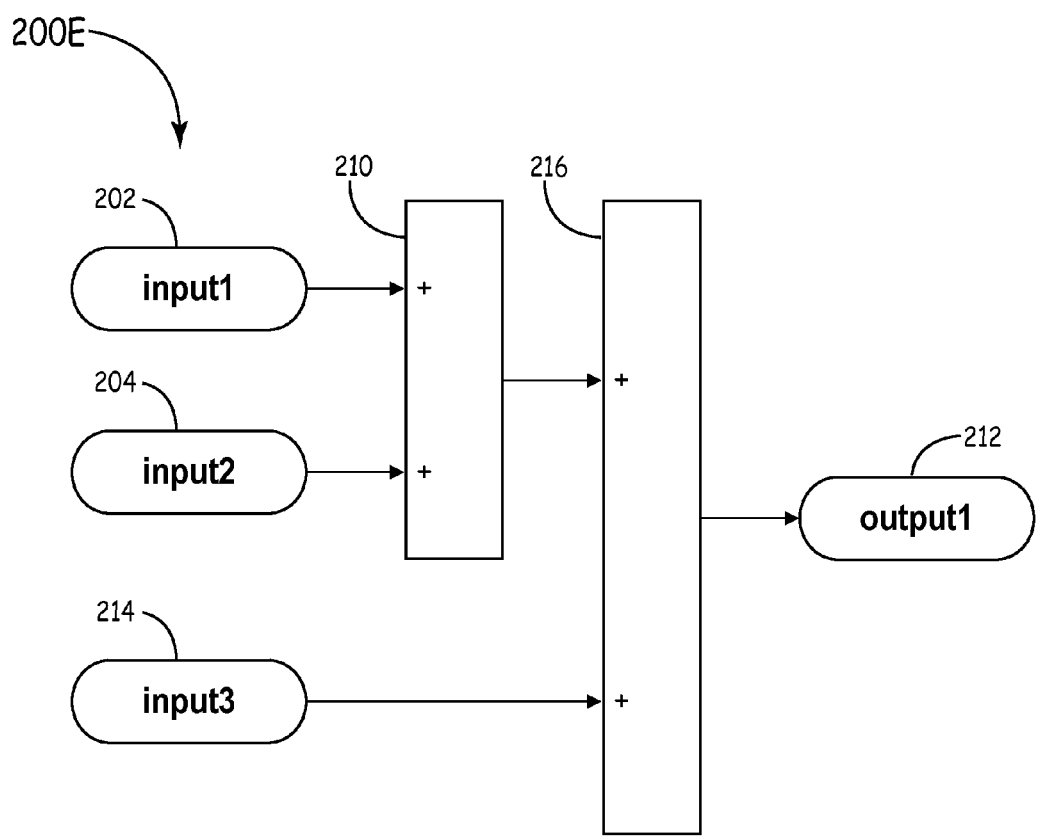

FIG. 2E is a block diagram of reference model 200E including input 202, input 204, input 214, sum block 210, sum block 216, and output 212. Input 202, input 204, and input 214 are inputs into the reference model 200E. Sum block 210 receives and sums input 202 and input 204 and outputs the sum to sum block 216. Sum block 216 receives and sums the output of sum block 210 and input 214 and outputs the sum as output 212.

Reference model 200E shown in FIG. 2E can be represented by mathematical expressions, such as:

output1=(input1+input2)+input3  1.

output1=input1+input2+input3  2.

output1=input1+(input2+input3)  3.

where input1 equals input 202, input2 equals input 204, input3 equals input 214, and output1 equals output 212. Based on associativity, any of the above mathematical expressions match reference model 200E shown in FIG. 2E.

All three mathematical expressions above can be verified according to the system and method described herein. First, parameter "input1" can be matched to the input port of sum block 210 that receives input 202 or the sum block 210 generally; parameter "input2" can be matched to the input port of sum block 210 that receives input 204 or the sum block 210 generally; parameter "input3" can be matched to the input port of sum block 216 that receives input 214 or the sum block 216 generally; and parameter "output1" can be matched to the output port of the sum block 216 that outputs to output 212 or the sum block 216 generally. Second, any unnecessary indication of operator precedence from the sub-expressions can be removed. The second and third mathematical expressions do not include any unnecessary indications of operator precedence. The indications of operator precedence in the third mathematical expression are necessary because the operator ordering is from left-right for the "+" operator. This means that without the parenthesis, "input1+input2" will be performed first, and the result of this addition will be added to input3. So, in this case, the parenthesis is changing the precedence and therefore it is a necessary indication of operator precedence. In contrast, the first mathematical expression above includes unnecessary indications of operator precedence. Once these unnecessary indications of operator precedence are removed, both the first and second mathematical expressions above will equal the second mathematical expression "output1=input1+input2+input3".

With regards to the first and second mathematical expressions, a first sub-expression "input1+input2+input3" of the normalized mathematical expressions can be matched with the input ports of sum block 210 that receive input 202 and input 204 and/or the sum block 210 and the input port of sum block 216 that receives input 214 and/or the sum block 216; a second sub-expression "output=subex1" of the first and second mathematical expressions above (where subex1 is the output of the first sub-expression "input1+input2+input3") can be matched with the output port of sum block 216 that outputs to output 212 and/or with sum block 216 generally. Thus, each component element of reference model 200E can be verified with the mathematical expressions above. Note that the ordering between the two sum operators is irrelevant because of associativity of addition, and hence we collectively match the entire sub-expression "input1+input2+input3" to the sum blocks 210 and 216 without matching them one-by-one in order. Additionally, although we don't care about the ordering between sum blocks 210 and 216, we ensure that no other block is present in the reference model between these two blocks.

With regards to the third mathematical expression, a first sub-expression "input2+input3" of the normalized mathematical expressions can be matched with the input port of the sum block 210 that receives input 204 and the input port of the sum block 216 that receives input 214 and/or the sum blocks 210 and 216 generally; a second sub-expression "input1+subex1" of the normalized mathematical expression (where subex1 is the output of the first sub-expression "input2+input3") can be matched with the input port 202 of sum block 210 and the input port of sum block 216 connected to sum block 210 and/or the sum blocks 210 and 216 generally; a third sub-expression "output=subex2" of the third mathematical expression above (where subex2 is the output of the second sub-expression "input1+subex1") can be matched with the output port of sum block 216 that outputs to output 212 and/or with sum block 216. Thus, each component element of reference model 200E can be verified with the mathematical expressions above. Note that although "input2" and "input3" in the sub-expression "input2+input3" are connected to different sum blocks we still successfully match them to the two sum blocks 210 and 216. This is because of the fact that there is no other block in the reference model present between the two sum blocks 210 and 216. Similarly, the sub-expression "input1+subex1" was successfully matched to the two sum blocks 210 and 216, because all the input ports of the two sum blocks 210 and 216 were matched to comparison model parameters.

Figure 2F:
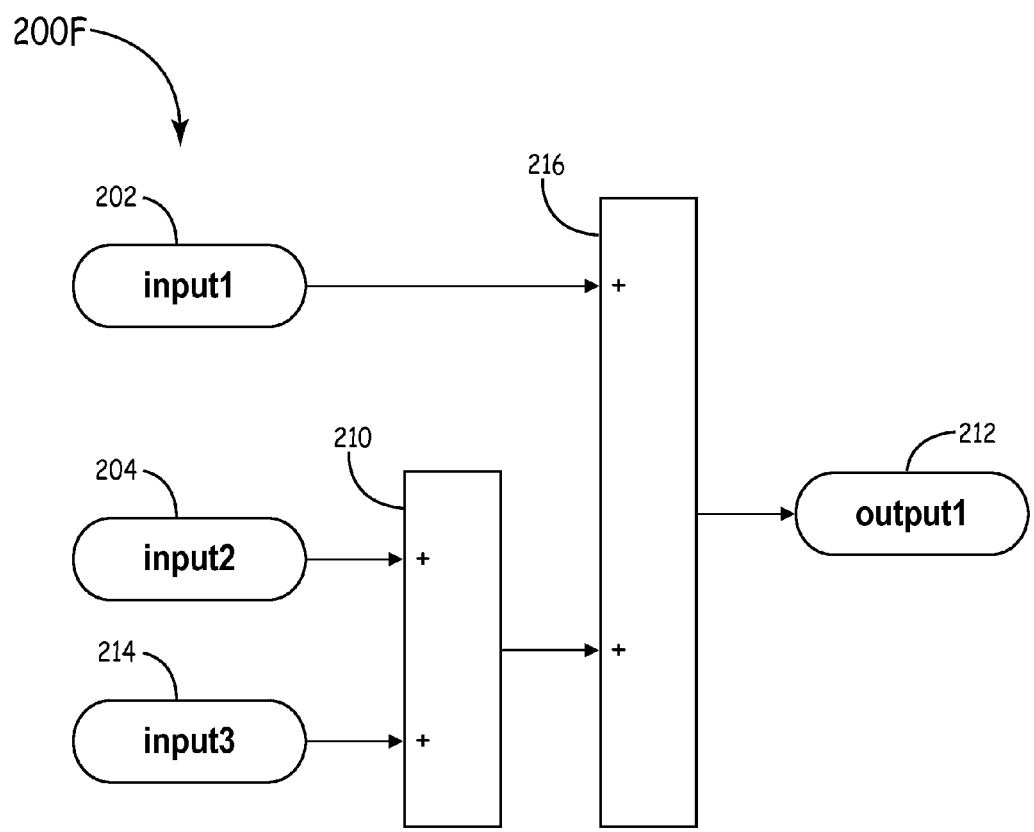

FIG. 2F is a block diagram of reference model 200F including input 202, input 204, input 214, sum block 210, sum block

216, and output 212. Input 202, input 204, and input 214 are inputs into the reference model 200F. Sum block 210 receives and sums input 204 and input 214 and outputs the sum to sum block 216. Sum block 216 receives and sums the output of sum block 210 and input 202 and outputs the sum as output 212.

Reference model 200F shown in FIG. 2F can be represented by mathematical expressions, such as:

$$\text{output1} = \text{input1} + (\text{input2} + \text{input3}) \quad\quad 1.$$

$$\text{output1} = (\text{input1} + \text{input2}) + \text{input3} \quad\quad 2.$$

$$\text{output1} = \text{input1} + \text{input2} + \text{input3} \quad\quad 3.$$

where input1 equals input 202, input2 equals input 204, input3 equals input 214, and output1 equals output 212. Based on associativity, any of the above mathematical expressions match reference model 200F shown in FIG. 2F.

All three mathematical expressions above can be verified according to the system and method described herein. First, parameter "input2" can be matched to the input port of sum block 210 that receives input 204 or the sum block 210 generally; parameter "input3" can be matched to the input port of sum block 210 that receives input 214 or the sum block 210 generally; parameter "input1" can be matched to the input port of sum block 216 that receives input 202 or the sum block 216 generally; and parameter "output1" can be matched to the output port of the sum block 216 that outputs to output 212 or the sum block 216 generally. Second, any unnecessary indication of operator precedence from the sub-expressions can be removed. The first and third mathematical expressions do not include any unnecessary indications of operator precedence. The indications of operator precedence in the first mathematical expression are necessary because the operator ordering is from left-right for the "+" operator. This means that without the parenthesis, "input1+input2" will be performed first, and the result of this addition will be added to input3. So, in this case, the parenthesis is changing the precedence and therefore it is a necessary indication of operator precedence. In contrast, the second mathematical expression above includes unnecessary indications of operator precedence. Once these unnecessary indications of operator precedence are removed, the second mathematical expression above will equal the third mathematical expression "output1=input1+input2+input3".

With regards to the second and third mathematical expressions, a first sub-expression "input1+input2+input3" of the normalized mathematical expressions can be matched with the input ports of sum block 210 that receive input 204 and input 214 and/or the sum block 210 and the input port of sum block 216 that receives input 202 and/or the sum block 216; a second sub-expression "output=subex1" of the second and third mathematical expressions above (where subex1 is the output of the first sub-expression "input1+input2+input3") can be matched with the output port of sum block 216 that outputs to output 212 and/or with sum block 216 generally. Thus, each component element of reference model 200F can be verified with the mathematical expressions above. Note that the ordering between the two sum operators is irrelevant because of associativity of addition, and hence we collectively match the entire sub-expression "input1+input2+input3" to the sum blocks 210 and 216 without matching them one-by-one in order. Additionally, although we don't care about the ordering between sum blocks 210 and 216, we ensure that no other block is present in the reference model between these two blocks.

With regards to the first mathematical expression, a first sub-expression "input2+input3" of the normalized mathematical expressions can be matched with the input port of the sum block 210 that receives input 204 and input 214 and/or the sum block 210 generally; a second sub-expression "input1+subex1" of the normalized mathematical expression (where subex1 is the output of the first sub-expression "input2+input3") can be matched with the input port 202 of sum block 216 and the input port of sum block 216 connected to sum block 210 and/or the sum block 216 generally; a third sub-expression "output=subex2" of the third mathematical expression above (where subex2 is the output of the second sub-expression "input1+subex1") can be matched with the output port of sum block 216 that outputs to output 212 and/or with sum block 216. Thus, each component element of reference model 200F can be verified with the mathematical expressions above.

Figure 3:
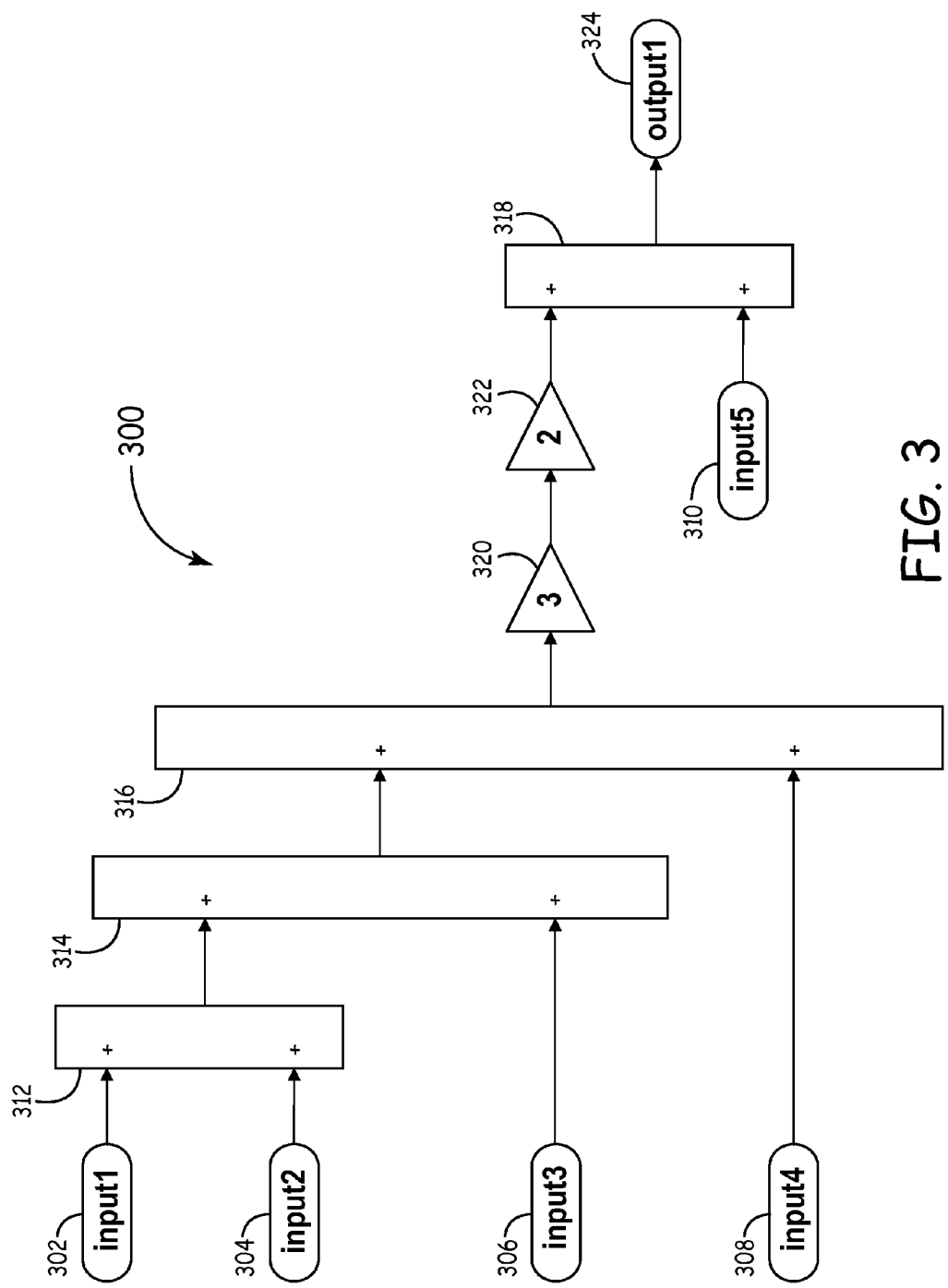
FIG. 3 is a block diagram depicting a reference model having sum and gain blocks as described below.

FIG. 3 is a block diagram of reference model 300 including input 302, input 304, input 306, input 308, input 310, sum block 312, sum block 314, sum block 316, sum block 318, gain block 320, gain block 322, and output 324. Reference model 300 is more complicated than reference models 200A-200F, but the same principles of the system and methods described herein apply. Input 302, input 304, input 306, input 308, and input 310 are inputs into the reference model 300. Sum block 312 receives and sums signal values received through input 302 and input 304 and outputs the sum to sum block 314. Sum block 314 receives and sums the output of sum block 312 and signal values received through input 306 and outputs the sum to the sum block 316. Sum block 316 receives and sums the output of sum block 314 and signal values received through input 308 and outputs the sum to gain block 320. Gain block 320 has a gain of 3. Thus, gain block 320 multiplies the output of sum block 316 by 3 and outputs it to gain block 322. Gain block 322 has a gain of 2. Thus, gain block 322 multiplies the output of gain block 322 by 2 and outputs it to sum block 318. Sum block 318 receives and sums the output of gain block 322 and signal values received through input 310 and outputs the sum as output 324.

An exemplary valid set of mathematical expressions (in exemplary embodiments, these mathematical expressions represent the comparison model, such as source code or a model) for reference model 300 is as follows:

```
gain1 = 3;
gain2 = 2;
sum1 = input2 + input1;
output1 = (gain1 · (((input3 + input4) + sum1)) · gain2) + input5;
```

First, the parameters can be matched to modeling constructs (which are blocks in a reference model in this example). Parameter "gain1" can be matched to gain block 320 and parameter "gain2" can be matched to gain block 322. Parameter "input2" can be matched to sum block 312 or the input port of sum block 312 that receives input 302. Parameter "input3" can be matched to sum block 312 or the input port of sum block 312 that receives input 304. Parameter "sum1" can be matched to sum block 312 or the output port of sum block 312 or the input port of sum block 314 that receives input from sum block 312. Parameter "input3" can be matched to sum block 314 or the input port of sum block 314 that receives input 306. Parameter "input4" can be matched to sum block 316 or the input port of sum block 316 that receives input 308. Parameter "input5" can be matched to sum block 318 or the input port of sum block 318 that receives input 310. Parameter "output1" can be matched to sum block 318 or the output port of sum block 318 that outputs to output 324. While parameters are discussed above, it is understood that in embodiments implementing the comparison model in source code, these parameters may be variables.

In exemplary embodiments where the comparison model is source code, external specifications (which may be documents, comments, or other text) provided with the definition of the C structures may be used to match these elements. In exemplary embodiments, these external specifications are included in the same comparison model 101. In other exemplary embodiments, these comments are included in header files. In exemplary embodiments, data flow analysis is used to identify block input/output (I/O) parameters that are used to initialize the parameter. In exemplary embodiments, this dependency is then used to identify the block input/output (I/O) that corresponds to the parameter.

Second, the expressions are normalized to remove any unnecessary indication of operator precedence from the expressions. None of the first three lines of code include any unnecessary indications of operator precedence. The fourth line of code includes unnecessary indications of operator precedence. Parsing the fourth line of code "output1=(gain1· (((input3+input4)+sum1))·gain2)+input5" from left to right, it is determined that the innermost parenthesis pair separates "input3+input4" from "+sum1". Thus, this parenthesis pair forces input4 to be tied to the first sum operator rather than the second one. Since both the contending operators are sum operators having the same level of precedence and left-right ordering, this parenthesis pair (indications of operator precedence) is unnecessary and is removed. In other examples, right-left ordering is used. The left-right or right-left ordering is applied when the operator precedence is equal between two operators. After the removal of this parenthesis pair, the fourth line of code is "output1=(gain1·((input3+input4+sum1))·gain2)+input5". The innermost parenthesis pair now separates "input3+input4+sum1" from nothing else. According to the rules of operator precedence adhered to by the mathematical expressions, this parenthesis pair is also unnecessary and is removed. After removal of this parenthesis pair, the fourth line of code is "output1=(gain1·(input3+input4+sum1)·gain2)+input5".

The innermost parenthesis pair now separates "input3+input4+sum1" from "gain1·" and "·gain2". This parenthesis pair cannot be eliminated, because it forces input3 and sum1 to be tied to the sum operator which has lower operator precedence than the product operator. The outermost parenthesis pair separates "gain1·(input3+input4+sum1)·gain2" from "+input5". Thus, this parenthesis pair forces "gain2" to be tied to the product operator instead of the sum operator. Since product operators have higher operator precedence than sum operators in the rules of operator precedence adhered to by the mathematical expressions, this parenthesis pair is unnecessary and will be eliminated by our algorithm. Thus, the final normalized code statement for the fourth line of code is "output1=gain1·(input3+input4+sum1)·gain2+input5".

Third, the set of expressions are matched to a set of blocks in the reference model. The input-output dependency of the identified blocks is also verified to be consistent with the data dependency of sub-expressions in the expressions. In embodiments, this is used to verify that the first three sum blocks 312, 314, and 316 are before the two gain blocks 320 and 322 and the last sum block 318 appears after the two gain blocks 320 and 322 as indicated by the operator precedence ordering in the set of expressions. After normalization, the exemplary valid set of source code for reference model 300 is as follows:

```
gain1 = 3;
gain2 = 2;
sum1 = input2 + input1;
output1 = gain1 · (input3 + input4 + sum1) · gain2 + input5;
```

The first two lines of code include the statements "gain1=3" and "gain2=2" which denote assignment of block parameter constants to parameters. In exemplary embodiments, review of these statements involves matching the constants used in the code to the parameter value of the corresponding blocks.

The third line of code "sum1=input2+input1" is statement without any parenthesis. Because there is no parenthesis used in this statement, the entire sub-expression "input2+input1" is considered. The operator used in this expression is "+", which implies that the corresponding block of interest in the reference model, as indicated by an operator template library 110 is a sum block. Systems and methods of this disclosure verify that the blocks corresponding to parameters "input2" and "input1" are sum blocks. Finally it is verified that either both the parameters match to the same block or that a direct path exists in the model using only sum blocks between the two blocks that represent the parameters. In this case, both are true because "input2" and "input1" match to the same sum block "sum1". Now the right side of the statement on line 2 is verified. In addition, the entire statement is verified because the parameters "sum1", "input2", and "input1" in the third line of source code all map to the same block "sum1" in the reference model. This means that (1) there are not any unverified blocks in the model that are in a direct path connecting any two blocks that matched the expression; and (2) the block corresponding to the output parameter of the statement has been verified.

The fourth line of code "output1=gain1·(input3+input4+sum1)·gain2+input5" is a statement with parenthesis. Exemplary systems and methods according to this disclosure start with the sub-expression within the inner-most parenthesis pair "input3+input4+sum1". The first operator in the sub-expression is "+", which implies that the corresponding model element of interest in the reference model, as indicated by the operator template library 110, is a sum block. Thus, two properties for the model element corresponding to parameters "input3" and "input4" are verified: (1) that sum block 314 and sum block 316 are both sum blocks; and (2) that either sum block 314 or sum block 316 are the same block, or there exits a direct path in the reference model using only sum blocks between sum block 314 and sum block 316. Similarly, the second operator in this sub-expression is also "+", which implies that the corresponding model element of interest in the reference model, as indicated by the operator template library 110, is a sum block. Thus, the system and methods verify (1) that the input parameter "sum1" is input into a sum block 314 which is either the same as sum block 316 or (2) that there exists a direct path in the model using only sum blocks between sum block 314 and sum block 316. In this case, the second option is true as can be seen in FIG. 3. The sub-expression has now been checked and the following properties are also true: sum block 314 is directly connected to sum block 316 using a signal. In addition, sum block 316 is annotated as the block representing the output of this sub-expression because it appears at the tail-end of any direct path connecting any two blocks that matched this sub-expression.

The next expression considered is "gain1·(subex1)·gain2+input5", where subex1 is the output of the sub-expression "input3+input4+sum1". The first operator in this expression is "·", which implies that the corresponding blocks from the operator template library 110 are gain or product blocks. In this case, it is verified that gain block 320 is either a gain block or a product block; and that there exists a direct path in the model using only gain or product blocks between gain block 320 and sum block 316. The latter denotes the output block of sub-expression subex1 equals "input3+input4+sum1". As can be seen in FIG. 3, both of these properties hold. Similar properties for parameters "gain2" and "input5" are also verified. This completes the verification of the entire right side of the statement. The following properties also hold: (1) there is not any unverified block in the model that lies in a direct path connecting any two blocks that matched this expression; and (2) the block corresponding to the output parameter of the statement has been verified. Thus, the source code above matches the reference model 300 in FIG. 3.

Figure 4:
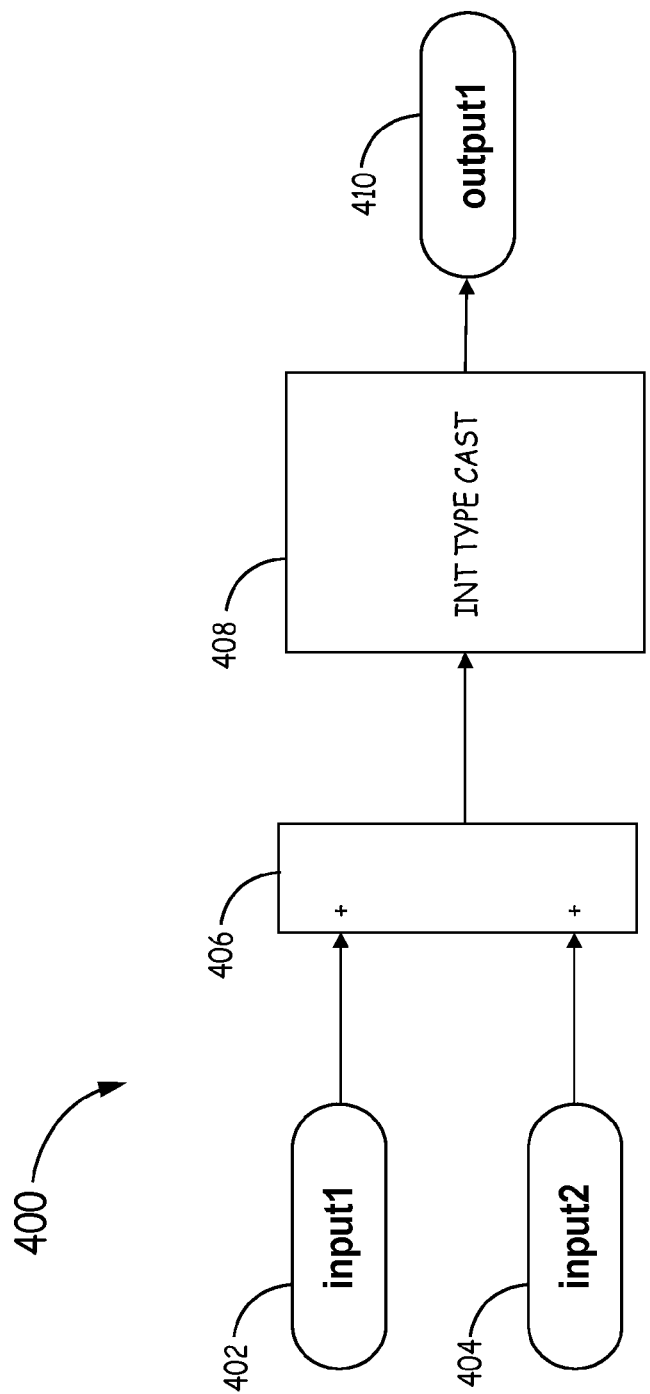
FIG. 4 is a block diagram depicting a reference model having a sum and a type cast block as described below.

FIG. 4 is a block diagram of reference model 400 including input 402, input 404, sum block 406, int type cast block 408, and output 410. Input 402 and input 404 are inputs into the reference model 400. Sum block 406 receives and sums signal values received through input 402 and input 404 and outputs the sum to int type cast block 408. Int type cast block 408 type casts the output of sum block 406 into an integer and outputs the type casted output as output 410.

An exemplary valid set of mathematic expressions (in exemplary embodiments, these mathematical expressions represent the comparison model, such as source code or a model) for reference model 400 is as follows:

output1=(INT)(input1+input2);

First, parameters can be matched to modeling constructs (which are blocks in a reference model in this example). Parameter "input1" can be matched to sum block 406 or the input port of sum block 406 that receives input 402. Parameter "input2" can be matched to sum block 406 or the input port of sum block 406 that receives input 404. Parameter "output1" can be matched to int type cast block 408 or the output port of int type cast block 408 that outputs to output 410. While parameters are discussed above, it is understood that in embodiments implementing the comparison model in source code, these parameters may be variables.

Second, the expressions are normalized to remove any unnecessary indications of operator precedence from the expressions. None of the expression includes any unnecessary indications of operator precedence.

Third, the set of expressions are matched to a set of blocks in the reference model. The input-output dependency of the identified blocks is also verified to be consistent with the data dependency of sub-expressions in the expressions. In embodiments, this is used to verify that the sum block 406 is before the int type cast block 408 as indicated by the operator precedence ordering in the set of expressions.

Thus, in the expression "output1=(INT)(input1+input2)", the first sub expression evaluated is "input1+input2". This first sub-expression "input1+input2" is matched to the sum block 406. The second sub-expression evaluated is "(INT) subex1" (where subex1 represents the output of the first sub-expression "input1+input2"). The second sub expression "(INT)subex1" is matched to the int type cast block 408. The third sub-expression evaluated is the assignment "output=subex2" (where subex2 represents the output of the second sub-expression "(INT)subex1"). The third sub-expression is matched to the int type cast block 408.

Figure 5:
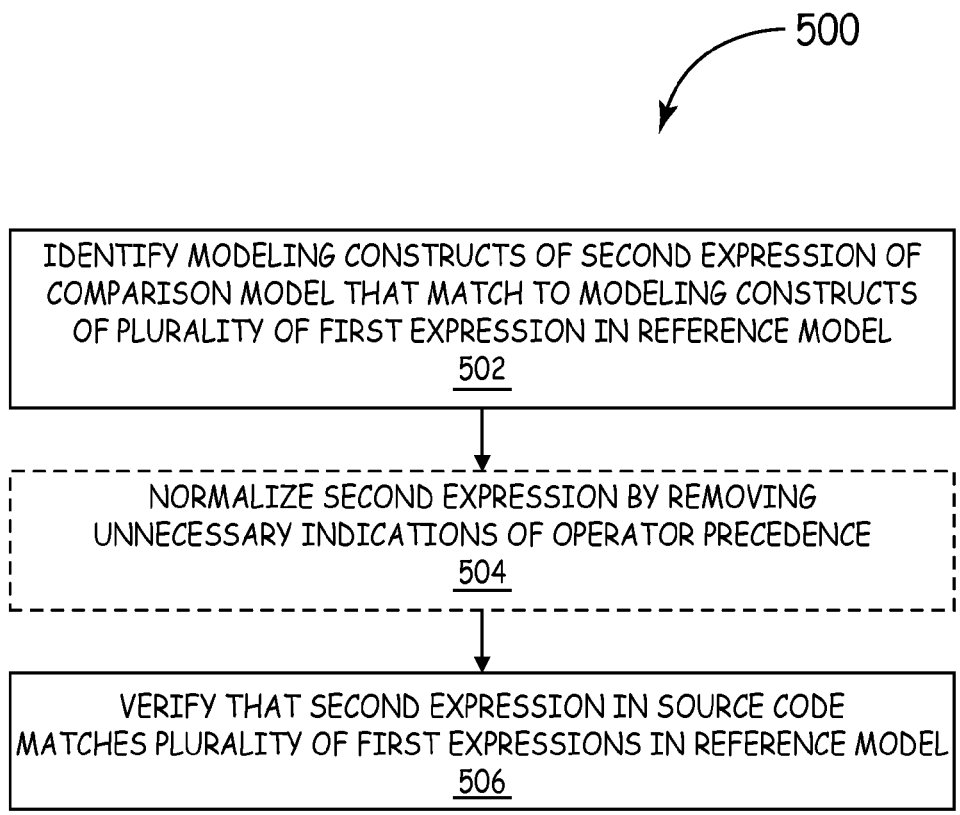
FIG. 5 is a flow chart depicting one embodiment of a method for verifying a comparison model against a reference model.

FIG. 5 is a flow chart depicting a method 500 for verifying a comparison model against a reference model. In exemplary embodiments, the comparison model is source code. In implementations where the comparison model is source code, the source code was previously produced by a source code generator or manually. In exemplary embodiments, this method is applied using functionality and hardware such as depicted and described with respect to FIGS. 1A-1B.

The method 500 begins at 502 with matching at least one parameter or modeling construct in the comparison model (such as a variable when the comparison model is implemented as source code) to either at least one modeling construct or at least one connective element of the modeling construct in a reference model. In exemplary embodiments, parameters in the comparison model are matched to connective elements of modeling constructs in the reference model. In other exemplary embodiments, parameters in the comparison model are matched to modeling constructs in the reference model generally. In exemplary embodiments, the modeling constructs are blocks in a Simulink® model and the connective elements are ports on the blocks in the Simulink® model.

In exemplary embodiments where the comparison model is implemented as source code, the source code is previously generated from the reference model by a source code generator or manually. In exemplary embodiments, the reference model adheres to a first set of syntax and semantics. In exemplary embodiments, the reference model includes at least one modeling construct having at least one connective element. In exemplary embodiments, the comparison model adheres to a second set of syntax and semantics. In exemplary embodiments, the comparison model includes at least one expression having at least one parameter. In exemplary embodiments, the comparison model adheres to rules of operator precedence. In exemplary embodiments, each expression in the comparison model represents at least one modeling construct in the reference model. In exemplary embodiments, each parameter in the comparison model represents at least one signal.

In exemplary embodiments where the comparison model is implemented as source code, the source code includes comments that can be used to aid in the matching of the at least one parameter in the source code to an element in the reference model. In exemplary embodiments, these comments are auto-generated by the source code generator and provide additional information regarding relationships between the source code and the reference model that aids in mapping of parameters to modeling constructs that facilitates the matching. In other exemplary embodiments, the source code generator uses rules when it generates parameters. In exemplary embodiments, these rules make it possible to identify the construct that a parameter represents. In other exemplary embodiments, the source code generator retains the structure of the reference model in the source code (such as a class being used for each block). In other exemplary embodiments, identification of which parameters belong to which block is performed or facilitated in other ways.

In exemplary embodiments having source code with local or temporary parameters, data flow analysis is used to identify block input/output (I/O) parameters that are used to initialize the local or temporary parameter. This dependency is then used to identify the block input/output (I/O) that corresponds to the local parameter.

The method 500 proceeds to optional block 504 with normalizing the expression by removing unnecessary indications of operator precedence. In exemplary embodiments, indications of operator precedence are unnecessary when the particular expression they are used in would be equivalent with or without the indications of operator precedence at issue, based on the rules of operator precedence defined for the comparison model. In exemplary embodiments in which the comparison model is source code, the source code is defined using programming languages where a parenthesis pair may be unnecessary within a particular line of source code based on the rules of operator precedence. In these embodiments, the parenthesis pair (or other unnecessary indications of operator precedence) is removed by parsing each code statement and eliminating any unnecessary parenthesis pairs. In exemplary embodiments, operator-precedence relationships applying to the particular source code used are encoded into the algorithm to determine whether an indication of operator precedence (such as a pair of parenthesis) is necessary or not. In other embodiments, no normalization is performed (such as when it is not necessary).

The method 500 proceeds to block 506 with verifying that the modeling construct in the comparison model matches one or more modeling constructs in the reference model. In exemplary embodiments where the comparison model is implemented in source code, this occurs when at least one operator of the sub-expression of the source code matches the modeling construct in the reference model and that the at least one parameter matches the at least one connective element of the modeling construct of the reference model. In exemplary embodiments where the comparison model is implemented in source code, verifying the operator matches the modeling construct may occur by looking up mappings between modeling constructs and operators in an operator template library. In exemplary embodiments, the operator template library maps each sub-expression of the at least one expression to at least one modeling construct.

Figure 6:
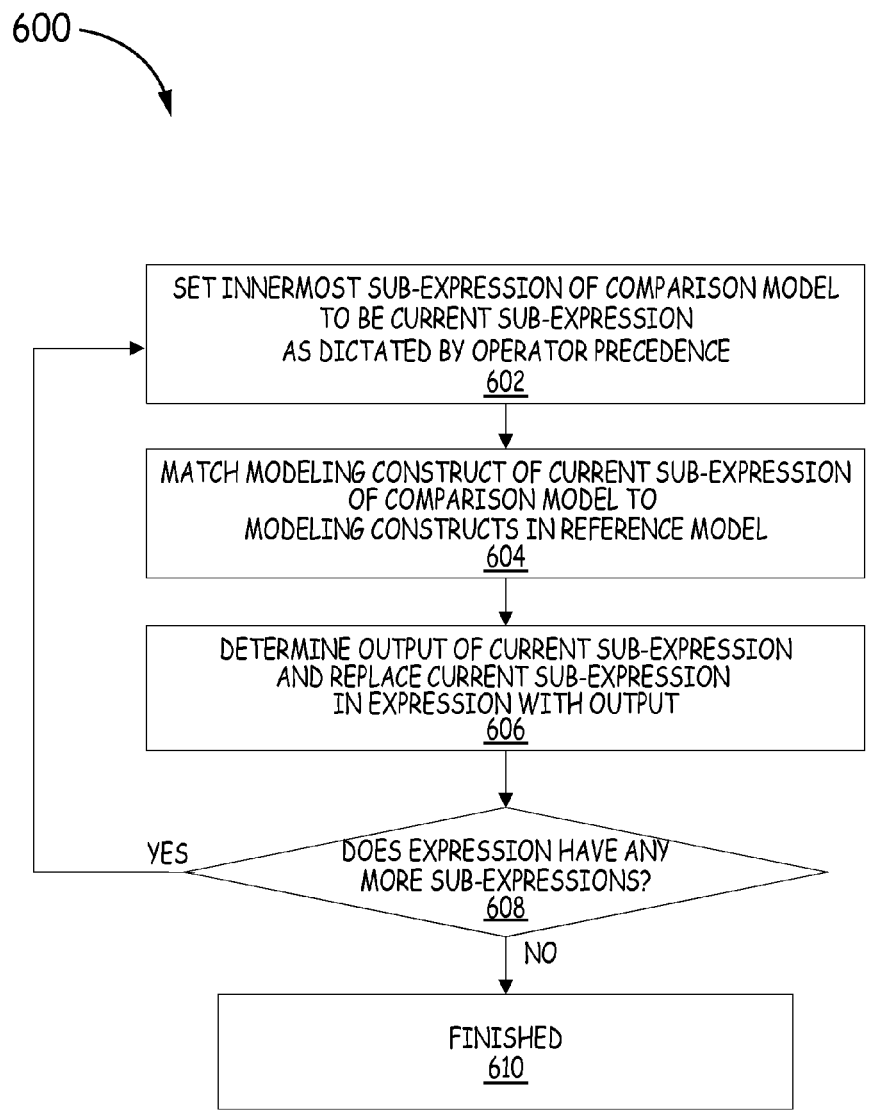
FIG. 6 is a flow chart depicting another embodiment of a method for verifying a comparison model against a reference model.

FIG. 6 is a flow chart depicting another embodiment of a method 600 for verifying a comparison model against a reference model. In exemplary embodiments, the comparison model is source code. In implementations where the comparison model is source code, the source code was previously produced by a source code generator or manually. In exemplary embodiments, this sub-method is implemented as a part of block 506 of method 500. In exemplary embodiments, this method is applied using functionality and hardware such as depicted and described with respect to FIGS. 1A-1B.

The method 600 begins at block 602 with setting the innermost sub-expression of a comparison model to be a current sub-expression as dictated by operator precedence. The method 600 proceeds to block 604 with matching the modeling construct of the current sub-expression of the comparison model to the modeling constructs in a reference model. The method 600 proceeds to block 606 with determining the output of the current sub-expression and replacing the current sub-expression in the expression with the output. The method 600 proceeds to block 608, where it is determined whether the expression has any more sub-expressions. If the expression has any more sub-expressions, then the method returns to block 602. If the expression does not have any more sub-expressions, then the method is finished.

Figure 7:
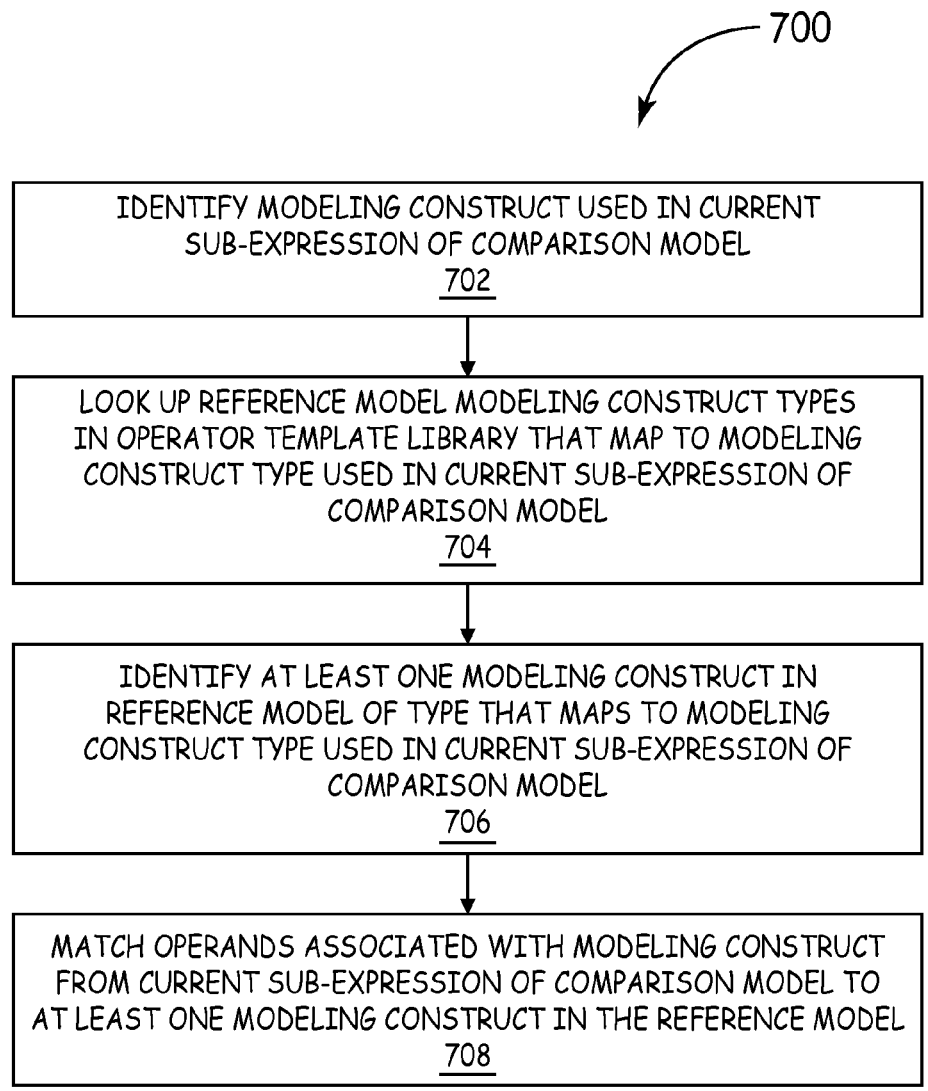
FIG. 7 is a flow chart depicting an exemplary sub-method for matching the modeling construct of a current sub-expression of a comparison model to modeling construct in the reference model.

FIG. 7 is a flow chart depicting an exemplary sub-method 700 for matching the modeling construct of a current sub-expression of a comparison model to modeling construct in the reference model. In exemplary embodiments, this sub-method is implemented as a part of block 604 of method 600. In exemplary embodiments where the comparison model is implemented using source code, the sub-method 700 may verify that the operator of a sub-expression of the source code matches the modeling construct in the reference model and that the at least one parameter matches the at least one connective element of the modeling construct of the reference model according to block 506 in FIG. 5. In exemplary embodiments, this method is applied using functionality and hardware such as depicted and described with respect to FIGS. 1A-1B.

The method 700 begins at block 702 with identifying a modeling construct used in a current sub-expression of a comparison model. In exemplary embodiments, the modeling construct may be an operator. The method 700 proceeds to block 704 with looking up modeling construct types for the reference model that map to the modeling construct type of the reference model in the operator template library 704. In other exemplary embodiments, the modeling construct types that map between the reference model and the comparison model are statically defined in the method or stored in another way. The method 700 proceeds to block 706 with identifying at least one modeling construct in the reference model of the type that maps to the modeling construct type used in the sub-expression of the comparison model.

The method proceeds to block 708 with matching parameters from the sub-expression of the comparison model to at least one modeling construct in the reference model. In exemplary embodiments, the parameters of the sub-expression of the comparison model will all map to a single modeling construct in the reference model (see reference model 200D shown in FIG. 2D and described above). In other exemplary embodiments, the parameters of the sub-expression of the comparison model will map to a plurality of modeling constructs of the same type in the reference model (see reference models 200E-200F shown in FIGS. 2E-2F and described above). Thus, the logic implementing blocks 706 and 708 is intelligent enough to know that a single model construct or multiple modeling constructs of the same type used in concert in the reference model can implement the same sub-expression in the comparison model and that they are functionally equivalent. In exemplary embodiments, the logic implementing block 708 includes a determination that either only a single modeling construct in the reference model is used to implement the sub-expression in the comparison model or that all modeling constructs implementing the sub-expression in the reference model are the same type and that there exists a direct path between each of the modeling constructs of the same type, so that they can functionally be equivalent to a single modeling construct in the reference model of a type that maps to the modeling construct in the sub-expression of the comparison model.

Figure 8:
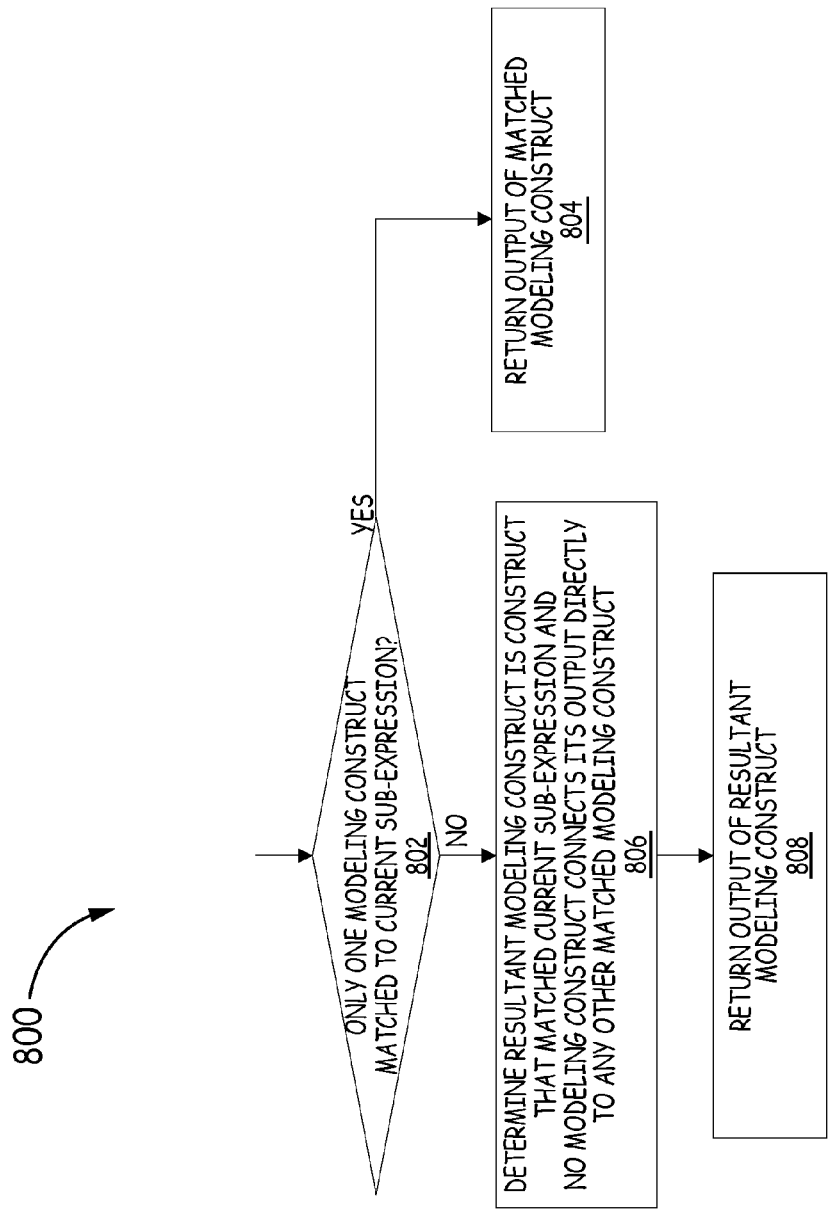
FIG. 8 is a flow chart depicting an exemplary sub-method for determining the output of the current sub-expression.

FIG. 8 is a flow chart depicting an exemplary sub-method 800 for determining the output of the current sub-expression. In exemplary embodiments, this sub-method is implemented as a part of block 606 of method 600. In exemplary embodiments, this method is applied using functionality and hardware such as depicted and described with respect to FIGS. 1A-1B.

The method 800 begins at block 802 with determining whether only one modeling construct in the reference model matched to the current sub-expression of the comparison model. If only one modeling construct of the reference model matched to the current sub-expression of the comparison model, then the output of the matched modeling construct is returned at block 804. If more than one modeling construct matched to the current sub-expression, then the method 800 branches to block 806, where the resultant modeling construct is a construct that matched the current sub-expression, and no modeling construct connects its output directly to any other matched modeling construct. The method 800 proceeds to block 808 where the output of the resultant modeling construct is returned.

Figure 9:
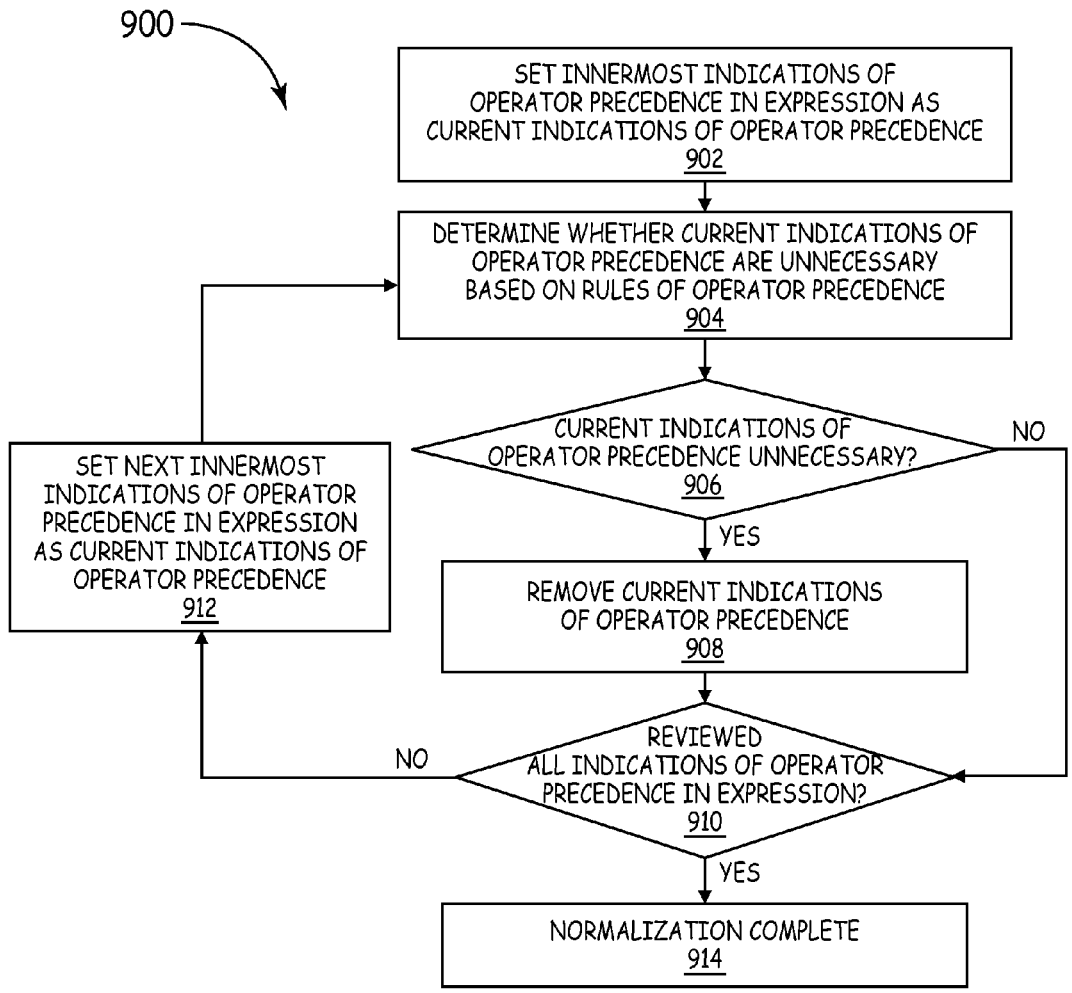
FIG. 9 is a flow chart depicting an exemplary sub-method for normalizing expressions by removing unnecessary indications of operator precedence.

FIG. 9 is a flow chart depicting an exemplary sub-method 900 for normalizing expressions in the comparison model by removing unnecessary indications of operator precedence. In exemplary embodiments, this sub-method is implemented as part of block 504 of method 500. In exemplary embodiments, this method is applied using functionality and hardware such as depicted and described with respect to FIGS. 1A-1B.

The method 900 begins at block 902 with setting the innermost indications of operator precedence in an expression as current indications of operator precedence. The method 900 proceeds to block 904 with determining whether the current indications of operator precedence are unnecessary based on rules of operator precedence adhered to by the comparison model. The method 900 proceeds to block 906 where the method branches based on whether the current indications of operator precedence are unnecessary. If the current indications of operator precedence are unnecessary, method 900 branches to block 908 with removing the current indications of operator precedence and proceeds to block 910. If the current indications of operator precedence are not unnecessary, method 900 branches to block 910. At block 910, the method branches based on whether all indications of operator precedence in the expression have been reviewed. If not all indications of operator precedence in the expression have been reviewed, method 900 branches to block 912 with setting the next innermost indications of operator precedence in the expression as the current indications of operator precedence and returns to block 904 to determine whether the new current indications of operator precedence are unnecessary based on the rules of operator precedence. If all indications of operator precedence in the expression have been reviewed at block 910, method 900 branches to block 914 where the normalization is completed.

Figure 10:
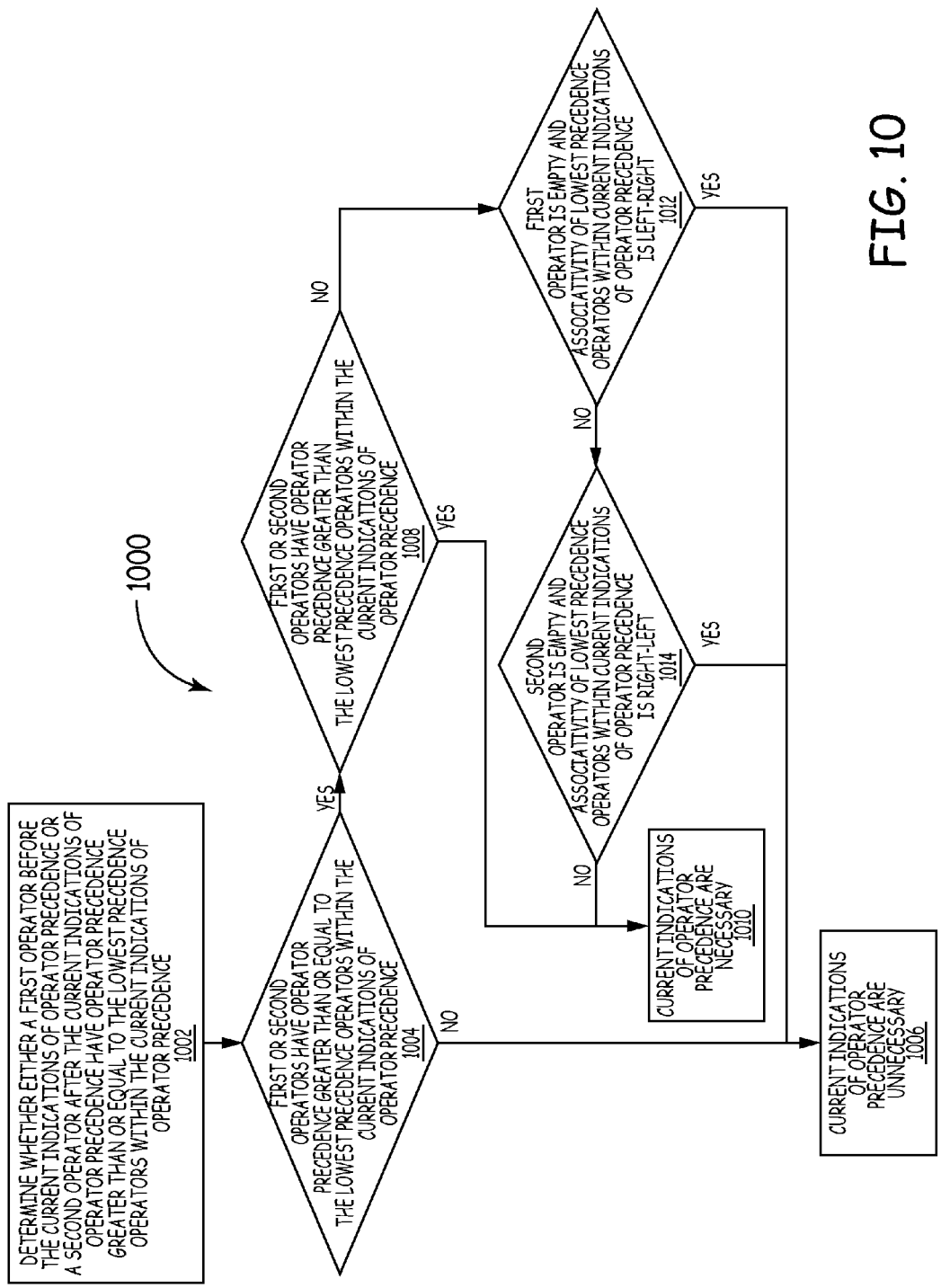
FIG. 10 is a flow chart depicting an exemplary sub-method for determining whether current indications of operator precedence are unnecessary based on rules of operator precedence.

FIG. 10 is a flow chart depicting an exemplary sub-method 1000 for determining whether current indications of operator precedence are unnecessary based on rules of operator precedence. In exemplary embodiments, this sub-method is implemented as part of block 904 of sub-method 900. In exemplary embodiments, this method is applied using functionality and hardware such as depicted and described with respect to FIGS. 1A-1B.

The method 1000 begins at block 1002 with determining whether either a first operator before the current indications of operator precedence or a second operator after the current indications of operator precedence have operator precedence greater than or equal to the lowest precedence operators within the current indications of operator precedence. The method 1000 proceeds to block 1004 where the method branches based on whether the first or second operators have operator precedence greater than or equal to the lowest precedence operators within the current indications of operator precedence. If the first or second operators do not have operator precedence greater than or equal to the lowest precedence operators within the current indications of operator precedence, then method 1000 branches to block 1006 where the current indications of operator precedence are deemed unnecessary. If the first or second operators have operator precedence greater than or equal to the lowest precedence operators within the current indications of operator precedence, then method 1000 branches to block 1008. If the first or second operators have operator precedence greater than the lowest precedence operators within the current indications of operator precedence, then method 1000 branches to block 1010 where the current indications of operator precedence are deemed necessary. If the first or second operators have operator precedence equal to the lowest precedence operators within the current indications of operator precedence, then method 1000 branches to block 1012. If the first operator is empty and the associativity of the lowest precedence operators within the current indications of operator precedence is left-right, then method 1000 branches to block 1006 where the current indications of operator precedence are deemed unnecessary. If the first operator is not empty or the associativity of the lowest precedence operators within the current indications of operator precedence is not left-right, then method 1000 branches to block 1014. If the second operator is empty and the associativity of the lowest precedence operators within the current indications of operator precedence is right-left, then method 1000 branches to block 1006 where the current indications of operator precedence are deemed unnecessary. If the second operator is not empty or the associativity of the lowest precedence operators within the current indications of operator precedence is not right-left, then method 1000 branches to block 1010 where the current indications of operator precedence are deemed necessary.

Figure 11:
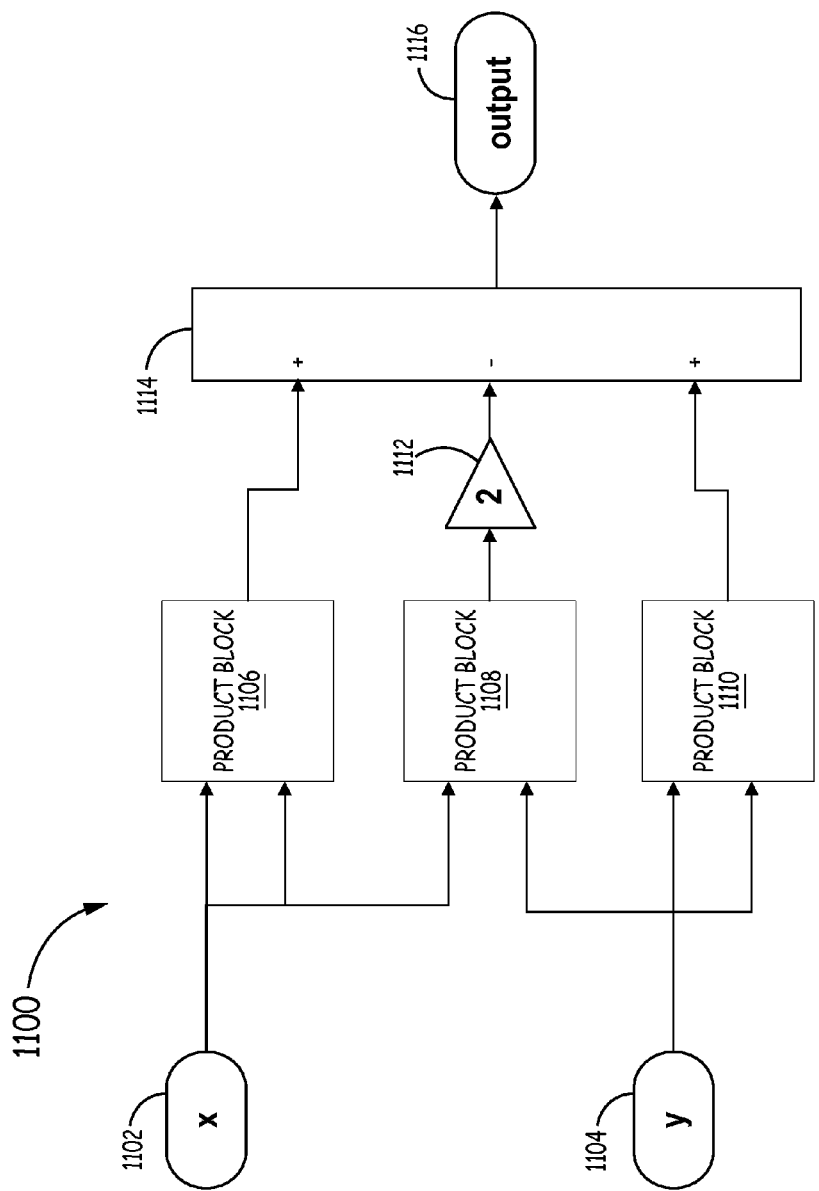
FIG. 11 is a block diagram depicting a reference model having product, gain, and sum blocks as described below.

FIG. 11 is a block diagram depicting a reference model 1100 including input 1102, input 1104, product block 1106, product block 1108, product block 1110, gain block 1112, sum block 1114, and output 1116. Input 1102 and input 1104 are inputs into the reference model 1100. Product block 1106 receives and multiplies signal values received through various input lines received through input 1102. Product block 1108 receives and multiplies signal values received through various input lines received through input 1102 and input 1104. Product block 1110 receives and multiplies signal values received through various input lines received through input 1104. Gain block 1112 receives the output of product block 1108 and applies a gain to the signal received from product block 1108. Sum block 1114 receives and sums signal values from the outputs of product block 1106, gain block 1112, and product block 1110 and outputs the sum as output 1116. FIG. 11 will be used to describe two alternative methodologies for verifying a comparison model having folded expression against a reference model (for example, verifying folded source code against a reference model). In exemplary embodiments, these alternative methodologies can be implemented using hardware such as depicted and described with respect to FIG. 1.

Figure 12A:
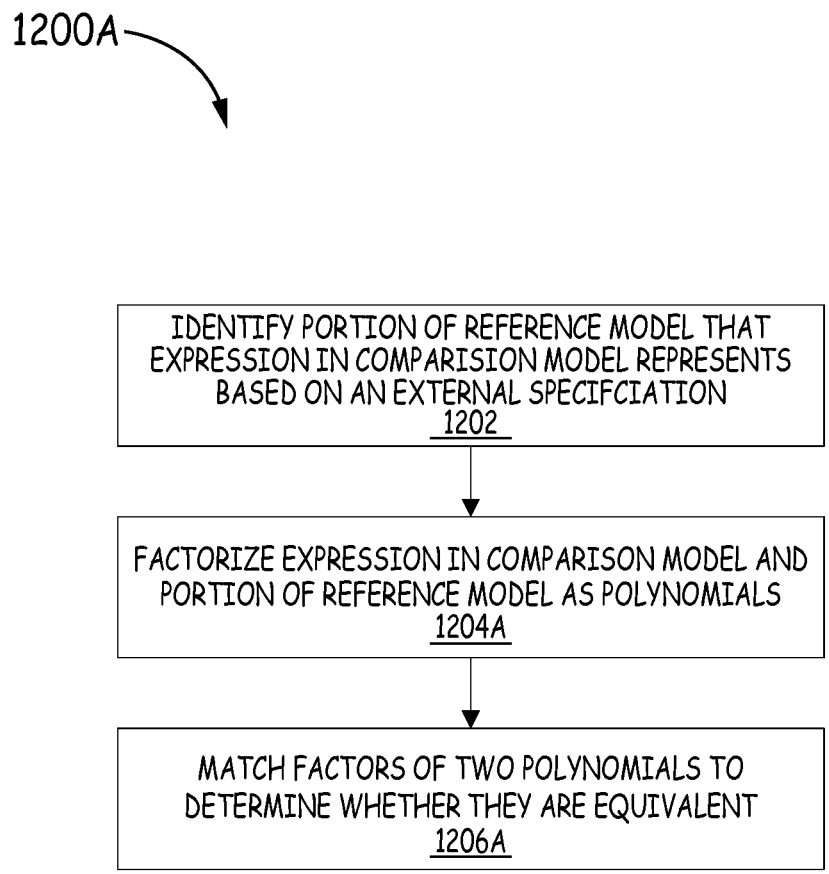
FIGS. 12A-12B are flow charts depicting exemplary methods for verifying a comparison model against a reference model.
Figure 12B:
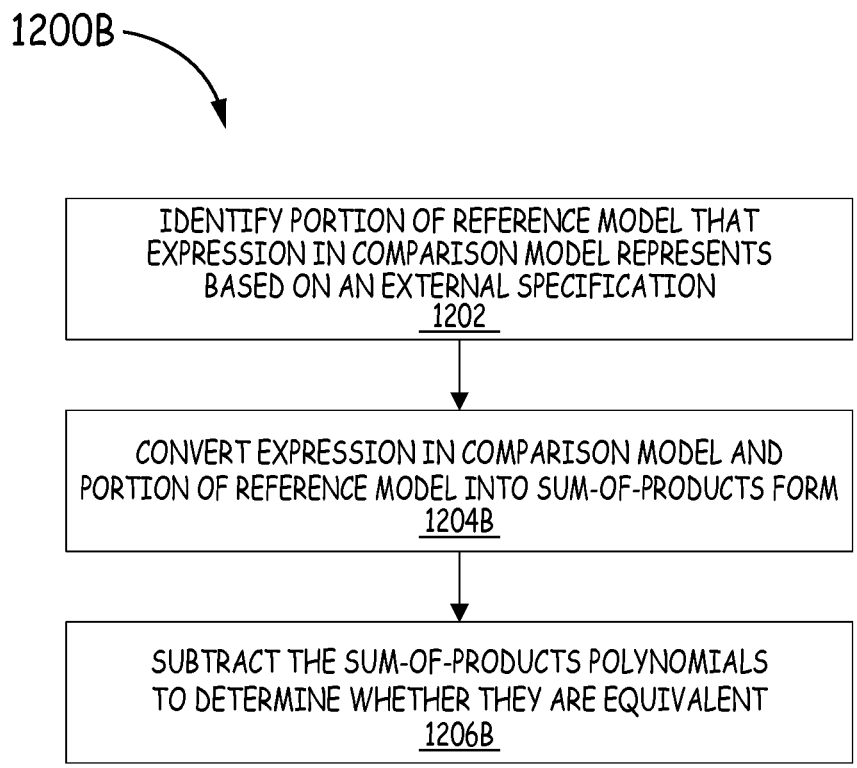

FIGS. 12A-12B are flow charts depicting addition exemplary methods for verifying a comparison model against a reference model. Each of FIGS. 12A-12B shows a different method, labeled method 1200A-1200B respectively.

FIG. 12A is a flow chart depicting a method 1200A for verifying a comparison model against a reference model using polynomial factorization. In exemplary embodiments, the comparison model is source code. In some implementations where the comparison model is source code, the source code was previously produced by a source code generator or manually. In exemplary embodiments, this method is applied using functionality and hardware such as depicted and described with respect to FIGS. 1A-1B above.

Method 1200A uses polynomial factorization to match the folded expressions in the comparison model (such as folded source code expressions) with the reference model. Both the comparison model and the reference model are treated as multivariate polynomials and factorized into irreducible polynomials using factorization methods such as square-free factorization, distinct-degree factorization, equal degree factorization, and basis reduction algorithm for lattices [2,1]. In exemplary embodiments, the specific technique used to generate the factors is not relevant as long as the same technique is used for both the comparison model and the reference model. Once the irreducible factors are generated, the next step is a simple comparison between the factors of the comparison and reference models to ascertain that they are identical. In exemplary embodiments, a factor of the comparison model is subtracted from a factor of the reference model to determine whether the factor from the comparison model is identical to the factor from the reference model. In other exemplary embodiments, the factor from the reference model is subtracted from the factor of the comparison model to determine whether the factor from the comparison model is identical to the factor from the reference model. In either case, if the result from the subtraction is zero, then the factors are identical. In other exemplary embodiments, other methods are used to determine whether the factors are identical.

More specifically, method 1200A begins at block 1202 with identifying a portion of a reference model that an expression in a comparison model represents based on an external specification. Method 1200A proceeds to step 1204A where the expression in the comparison model and a portion of the reference model are factorized as polynomials. For example, when the reference model 1100 has a signal "x" on input 1102 and a signal "y" on input 1104 as well as a gain of "2" on gain block 1112, then product block 1106 has an output of "$x^2$", product block 1108 has an output of "xy", product block 1110 has an output of "$y^2$", gain block 1112 has an output of "2xy", and sum block 1114 has an output of "$x^2+y^2-2xy$". Thus, the output signal at output 1116 is represented by the polynomial "$x^2+y^2-2xy$". This polynomial can be factorized to "(x−y)(x−y)".

An exemplary valid mathematic expression in the comparison model for the reference model 1100 is as follows (in exemplary embodiments, these mathematical expressions represent the comparison model, such as source code or a model):

$$output1 = x^2 + y^2 - 2xy;$$

This comparison model polynomial representation can also be factorized to "(x−y)(x−y)".

Method 1200A then proceeds to step 1206A, where the factors of the two polynomials are matched to determine whether they are equivalent. As described above, this comparison could be as simple as a factor of the comparison model being subtracted from a factor of the reference model to determine whether the factor from the comparison model is identical to the factor from the reference model or vice versa. If the result is zero, then the two polynomials match and thusly, the expression in the comparison model is verified against the portion of the reference model. If the result of the subtraction is non-zero, then the two polynomials do not match and thusly, the expression in the comparison model is not verified against the portion of the reference model.

Method 1200B uses sum-of-products to match the folded expressions in the comparison model (such as folded source code expressions) with the reference model. Both the comparison model and the reference model are treated as multivariate polynomials and expanded into a normalized sum-of-products form. Once the polynomials are expanded, the next step is a simple comparison between the summation terms in the two polynomials to ascertain whether or not they are identical. In exemplary embodiments, the terms of the expanded polynomial for the comparison model are subtracted from the terms of the expanded polynomial for the reference model to determine whether the terms of the expanded polynomial for the comparison model are identical to the terms of the expanded polynomial for the reference model. In other exemplary embodiments, the terms of the expanded polynomial for the reference model are subtracted from the terms of the expanded polynomial for the comparison model to determine whether the terms of the expanded polynomial for the comparison model are identical to the terms of the expanded polynomial for the reference model. In either case, if the result from the subtraction is zero, then the terms for the expanded polynomials are identical. In other exemplary embodiments, other methods are used to determine whether the factors are identical.

More specifically, method 1200B begins at block 1202 with identifying a portion of a reference model that an expression in a comparison model represents based on an external specification. Method 1200B proceeds to step 1204B where the expression in the comparison model and a portion of the reference model are converted into sum-of-products form. For example, when the reference model 1100 has a signal "x" on input 1102 and a signal "y" on input 1104 as well as a gain of "2" on gain block 1112, then product block 1106 has an output of "$x^2$", product block 1108 has an output of "xy", product block 1110 has an output of "$y^2$", gain block 1112 has an output of "2xy", and sum block 1114 has an output of "$x^2+y^2-2xy$". Thus, the output signal at output 1116 is represented by the polynomial "$x^2+y^2-2xy$". This polynomial is in the sum of products form.

An exemplary valid mathematic expression in the comparison model for the reference model 1100 is as follows (in exemplary embodiments, these mathematical expressions represent the comparison model, such as source code or a model):

$$output1 = (x-y)(x-y);$$

This comparison model polynomial representation can be converted into the sum-of-products form and represented as "$x^2+y^2-2xy$".

Method 1200B then proceeds to step 1206B, where the sum-of-products polynomials are matched to determine whether they are equivalent. As described above, this comparison could be as simple as subtracting the product terms of the sum-of-products representing the comparison model from the product terms of the sum-of-products representing the reference model to determine whether the factor from the comparison model is identical to the factor from the reference model or vice versa. If the result is zero, then the two polynomials match and thusly, the expression in the comparison model is verified against the portion of the reference model. If the result of the subtraction is non-zero, then the two polynomials do not match and thusly, the expression in the comparison model is not verified against the portion of the reference model.

Several means are available to implement the systems and methods of the current invention as discussed in this specification. In addition to any means discussed above, these means include, but are not limited to, digital computer systems, microprocessors, programmable controllers, field programmable gate arrays (FPGAs) and application-specific integrated circuits (ASICs). Therefore other embodiments of the present invention are program instructions resident on computer readable media which when implemented by such means enable the controllers to implement embodiments of the present invention. Computer readable media include devices such as any physical form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Example Embodiments

Example 1 includes a system for verifying that a comparison model having folded expressions matches a reference model, the system comprising: at least one memory device that stores a reference model and a comparison model, wherein the comparison model was previously generated based on the reference model; wherein the reference model adheres to a first set of syntax and semantics, wherein the reference model includes a plurality of first expressions, each of the first expressions including a first operator and a first operand; wherein the comparison model adheres to a second set of syntax and semantics, wherein the comparison model includes a second expression, the second expression including a second operator and a second operand; and a processing unit configured to match the second expression with the plurality of first expressions.

Example 2 includes the system of Example 1, wherein the processing unit is further configured to normalize the second expression of the comparison model by removing unnecessary indications of operator precedence from the second expression.

Example 3 includes the system of any of Examples 1-2, wherein the processing unit is further configured to access a template library to identify acceptable matches between the second operator of the second expression and the plurality of first operators of the first expressions.

Example 4 includes the system of any of Examples 1-3, wherein the comparison model is source code; and wherein the second operand is a variable.

Example 5 includes the system of Example 4, wherein the processing unit is further configured to verify that the second operator of the source code matches at least one first operator and that the variable matches at least one first operand associated with the at least one first operator.

Example 6 includes the system of any of Examples 4-5, wherein the processing unit is further configured to normalize the second expression of the comparison model by removing unnecessary indications of operator precedence from the second expression; and wherein the unnecessary indications of operator precedence are parenthesis.

Example 7 includes the system of any of Examples 4-6, wherein the processing unit is further configured to access an operator template library to identify acceptable matches between the second operator of the source code and the plurality of first operators of the first expressions.

Example 8 includes the system of any of Examples 1-7, wherein the first operator is a block; and wherein the first operand is a connective element.

Example 9 includes a program-product comprising a non-transitory processor-readable medium on which program instructions are embodied, wherein the program instructions are configured, when executed by the at least one programmable processor, to cause the at least one programmable processor to verify that a comparison model having folded expressions matches a reference model; wherein the reference model adheres to a first set of syntax and semantics and includes a plurality of first expressions, each first expression including a first operator and a first operand; wherein the comparison model adheres to a second set of syntax and semantics and includes a second expression including a second operator and a second operand; and wherein the program instructions configured to cause the at least one programmable processor to verify that a comparison model having folded expressions matches a reference model by matching the second expression with the plurality of first expressions.

Example 10 includes the program-product of Example 9, wherein the program instructions are further configured, when executed by the at least one programmable processor, to cause the at least one programmable processor to: normalize the second expression of the comparison model by removing unnecessary indications of operator precedence from the second expression.

Example 11 includes the program-product of any of Examples 9-10, wherein the program instructions are further configured, when executed by the at least one programmable processor, to cause the at least one programmable processor to: access an operator template library to identify acceptable matches between the second operator of the second expression and the plurality of first operators of the first expressions.

Example 12 includes the program-product of any of Examples 9-12, wherein the comparison model is source code; and wherein the second operand is a variable.

Example 13 includes the program-product of Example 12, wherein the program instructions are further configured, when executed by the at least one programmable processor, to cause the at least one programmable processor to: verify that the second operator of the source code matches at least one first operator and that the variable matches at least one first operand associated with the at least one first operator.

Example 14 includes the program-product of any of Examples 12-13, wherein the program instructions are further configured, when executed by the at least one programmable processor, to cause the at least one programmable processor to: normalize the second expression of the comparison model by removing unnecessary indications of operator precedence from the second expression; and wherein the unnecessary indications of operator precedence are parenthesis.

Example 15 includes the program-product of any of Examples 9-14, wherein the first operator is a block; and wherein the first operand is a connective element.

Example 16 includes a system for verifying folded source code, the system comprising: at least one memory device storing a reference model having a particular functionality and a set of previously generated source code expressions intended to implement the particular functionality of the reference model; wherein the reference model adheres to a first set of syntax and semantics and includes a plurality of first expressions, each of the first expressions including a first operator and a first operand; wherein the set of previously generated source code expressions adheres to a second set of syntax and semantics and includes a second expression having a second operator and a second operand; a processing unit configured to match the second expression with the plurality of first expressions.

Example 17 includes the system of Example 16, wherein the processing device is further configured to normalize the second expression of the source code by removing unnecessary indications of operator precedence from the second expression.

Example 18 includes the system of Example 17, wherein the unnecessary indication of operator precedence are parenthesis.

Example 19 includes the system of any of Examples 16-18, wherein the processing unit is further configured to access a template library to identify acceptable matches between the second operator of the second expression and the plurality of first operators of the first expressions.

Example 20 includes the system of any of Examples 16-20, wherein the first operator is a block; and wherein the first operator is a connective element.

What is claimed is:

1. A system for verifying that a comparison model having folded expressions matches a reference model, the system comprising:
    at least one memory device that stores a reference model and a comparison model, wherein the comparison model was previously generated based on the reference model;
    wherein the reference model adheres to a first set of syntax and semantics and first rules of operator precedence defining a first order in which operations are performed in expressions, wherein the reference model includes a plurality of first expressions, each of the first expressions including at least one operator and at least one operand, a first expression of the plurality of first expressions including a first operator having a first operator precedence level and a first set of operands associated with the first operator, wherein commutativity and associativity allow various equivalent ordering and grouping of operators of the first operator precedence level within the first expression based on the first rules of operator precedence;
    wherein the comparison model adheres to a second set of syntax and semantics and second rules of operator precedence defining a second order in which operations are performed in expressions, wherein the comparison model includes a second folded expression, the second folded expression including a second operator having a second operator precedence level and a second set of operands associated with the second operator, wherein commutativity and associativity allow various equivalent ordering and grouping of operators of the second operator precedence level within the second expression based on the second rules of operator precedence;
    wherein the processing unit is further configured to match the second folded expression with the plurality of first expressions in part by matching the first operator of the first expression with the second operator of the second expression and verifying that the first set of operands is equivalent with the second set of operands even when the first set of operands is in a different order than the second set of operands based on commutativity or grouped in a different way based on associativity; and
    wherein the processing unit is further configured to determine whether the second folded expression is semantically equivalent to the plurality of first expressions based on the matching of the second folded expression with the plurality of first expressions, wherein the second folded expression need not be syntactically identical to the plurality of first expressions to be semantically equivalent.

2. The system of claim 1, wherein the processing unit is further configured to normalize the second expression of the comparison model by removing unnecessary indications of operator precedence from the second expression based on associativity; and
    wherein the unnecessary indication of operator precedence may impact the associative property of operators.

3. The system of claim 1, wherein the processing unit is further configured to access a template library to identify acceptable matches between the second operator of the second folded expression and the plurality of first operators of the first expressions.

4. The system of claim 1, wherein the comparison model is source code; and
    wherein the second operand is a variable.

5. The system of claim 4, wherein the processing unit is further configured to verify that the second operator of the source code matches at least one first operator and that the variable matches at least one first operand associated with the at least one first operator.

6. The system of claim 4, wherein the processing unit is further configured to normalize the second expression of the comparison model by removing unnecessary indications of operator precedence from the second expression based on associativity;
    wherein the unnecessary indication of operator precedence may impact the associative property of operators; and
    wherein the unnecessary indications of operator precedence are parenthesis.

7. The system of claim 4, wherein the processing unit is further configured to access an operator template library to identify acceptable matches between the second operator of the source code and the plurality of first operators of the first expressions.

8. The system of claim 1, wherein the first operator is a block; and wherein the first operand is a connective element.

9. A program-product comprising a non-transitory processor-readable medium on which program instructions are embodied, wherein the program instructions are configured, when executed by the at least one programmable processor, to cause the at least one programmable processor to verify that a comparison model having folded expressions matches a reference model;
    wherein the reference model adheres to a first set of syntax and semantics and first rules of operator precedence defining a first order in which operations are performed in expressions, the reference model includes a plurality of first expressions, each first expression including at least one operator and at least one operand, a first expression of the plurality of first expressions including a first operator having a first operator precedence level and a first set of operands associated with the first operator, wherein commutativity and associativity allow various equivalent ordering and grouping of operators of the first operator precedence level within the first expression based on the first rules of operator precedence;
    wherein the comparison model adheres to a second set of syntax and semantics and second rules of operator precedence defining a second order in which operations are performed in expressions, the comparison model includes a second folded expression including a second operator having a second operator precedence level and a second set of operands associated with the second operator, wherein commutativity and associativity allow various equivalent ordering and grouping of operators of the second operator precedence level within the second expression based on the second rules of operator precedence; and
    wherein the program instructions are further configured to cause the at least one programmable processor to verify that a comparison model having folded expressions matches a reference model by matching the second folded expression with the plurality of first expressions in part by matching the first operator of the first expression with the second operator of the second expression and verifying that the first set of operands is equivalent with the second set of operands even when the first set of operands is in a different order than the second set of operands associated with the second operator based on commutativity or grouped in a different way based on associativity; and wherein the processing unit is further configured to determine whether the second folded expression is semantically equivalent to the plurality of first expressions based on the matching of the second folded expression with the plurality of first expressions, wherein the second folded expression need not be syntactically identical to the plurality of first expressions to be semantically equivalent.

10. The program-product of claim 9, wherein the program instructions are further configured, when executed by the at least one programmable processor, to cause the at least one programmable processor to:

normalize the second expression of the comparison model by removing unnecessary indications of operator precedence from the second expression based on associativity; and wherein the unnecessary indications of operator precedence may impact the associative property of operators.

11. The program-product of claim 9, wherein the program instructions are further configured, when executed by the at least one programmable processor, to cause the at least one programmable processor to:

access an operator template library to identify acceptable matches between the second operator of the second folded expression and the plurality of first operators of the first expressions.

12. The program-product of claim 9, wherein the comparison model is source code; and wherein the second operand is a variable.

13. The program-product of claim 12, wherein the program instructions are further configured, when executed by the at least one programmable processor, to cause the at least one programmable processor to:

verify that the second operator of the source code matches at least one first operator and that the variable matches at least one first operand associated with the at least one first operator.

14. The program-product of claim 12, wherein the program instructions are further configured, when executed by the at least one programmable processor, to cause the at least one programmable processor to:

normalize the second expression of the comparison model by removing unnecessary indications of operator precedence from the second expression based on associativity;

wherein the unnecessary indication of operator precedence may impact the associative property of operators; and wherein the unnecessary indications of operator precedence are parenthesis.

15. The program-product of claim 9, wherein the first operator is a block; and wherein the first operand is a connective element.

16. A system for verifying folded source code, the system comprising:

at least one memory device storing a reference model having a particular functionality and a set of previously generated source code expressions intended to implement the particular functionality of the reference model;

wherein the reference model adheres to a first set of syntax and semantics and first rules of operator precedence defining a first order in which operations are performed in expressions, wherein the reference model includes a plurality of first expressions, each of the first expressions including at least one operator and at least one operand, a first expression of the plurality of first expressions including a first operator having a first operator precedence level and a first set of operands associated with the first operator, wherein commutativity and associativity allow various equivalent ordering and grouping of operators of the first operator precedence level within the first expression based on the first rules of operator precedence;

wherein the set of previously generated source code expressions adheres to a second set of syntax and semantics and second rules of operator precedence defining a second order in which operations are performed in expressions, wherein the set of previously generated source code expressions includes a second folded expression including a second operator having a second operator precedence level and a second set of operands associated with the second operator, wherein commutativity and associativity allow various equivalent ordering and grouping of operators of the second operator precedence level within the second expression based on the second rules of operator precedence;

a processing unit configured to match the second folded expression with the plurality of first expressions in part by matching the first operator of the first expression with the second operator of the second expression and verifying that the first set of operands is equivalent with the second set of operands even when the first set of operands is in a different order than the second set of operands based on commutativity or grouped in a different way based on associativity; and wherein the processing unit is further configured to determine whether the second folded expression is semantically equivalent to the plurality of first expressions based on the matching of the second folded expression with the plurality of first expressions, wherein the second folded expression need not be syntactically identical to the plurality of first expressions to be semantically equivalent.

17. The system of claim 16, wherein the processing device is further configured to normalize the second expression of the source code by removing unnecessary indications of operator precedence from the second expression based on associativity; and wherein the unnecessary indications of operator precedence may impact the associative property of operators.

18. The system of claim 17, wherein the unnecessary indication of operator precedence are parenthesis.

19. The system of claim 16, wherein the processing unit is further configured to access a template library to identify acceptable matches between the second operator of the second folded expression and the plurality of first operators of the first expressions.

20. The system of claim 16, wherein the first operator is a block; and wherein the first operator is a connective element.

21. The system of claim 1, wherein the processing unit is further configured to convert the plurality of first expressions of the reference model into at least a first sum-of-product polynomial;

wherein the processing unit is further configured to convert the second folded expression of the comparison model into at least a second sum-of-products polynomial; and wherein the processing unit is further configured to match the at least a first sum-of-products polynomial with the at least a second sum-of-products polynomial to determine whether the first sum-of-products polynomial is equivalent to the second sum-of-products polynomial.

22. The system of claim 4, wherein the processing unit is further configured to convert the plurality of first expressions of the reference model into at least a first sum-of-product polynomial;

wherein the processing unit is further configured to convert the second folded expression of the comparison model into at least a second sum-of-products polynomial;

wherein the processing unit is further configured to match the at least a first sum-of-products polynomial with the at least a second sum-of-products polynomial to determine whether the first sum-of-products polynomial is equivalent to the second sum-of-products polynomial; and wherein the unnecessary indications of operator precedence in the source code are parenthesis.

23. The program-product of claim 9, wherein the program instructions are further configured, when executed by the at least one programmable processor, to cause the at least one programmable processor to:

convert the plurality of first expressions of the reference model into at least a first sum-of-product polynomial;

convert the second folded expression of the comparison model into at least a second sum-of-products polynomial; and match the at least a first sum-of-products polynomial with the at least a second sum-of-products polynomial to determine whether the first sum-of-products polynomial is equivalent to the second sum-of-products polynomial.

24. The program-product of claim 12, wherein the program instructions are further configured, when executed by the at least one programmable processor, to cause the at least one programmable processor to:

convert the plurality of first expressions of the reference model into at least a first sum-of-product polynomial;

convert the second folded expression of the comparison model into at least a second sum-of-products polynomial;

match the at least a first sum-of-products polynomial with the at least a second sum-of-products polynomial to determine whether the first sum-of-products polynomial is equivalent to the second sum-of-products polynomial; and wherein the unnecessary indications of operator precedence in the source code are parenthesis.

25. The system of claim 16, wherein the processing unit is further configured to convert the plurality of first expressions of the reference model into at least a first sum-of-product polynomial;

wherein the processing unit is further configured to convert the second folded expression of the set of previously generated source code expressions into at least a second sum-of-products polynomial; and wherein the processing unit is further configured to match the at least a first sum-of-products polynomial with the at least a second sum-of-products polynomial to determine whether the first sum-of-products polynomial is equivalent to the second sum-of-products polynomial.

\* \* \* \* \*